US011869371B2

(12) United States Patent
Kusumi et al.

(10) Patent No.: US 11,869,371 B2
(45) Date of Patent: Jan. 9, 2024

(54) UNMANNED AERIAL VEHICLE TRAFFIC MANAGEMENT APPARATUS, TAKEOFF AND LANDING FACILITY MANAGEMENT APPARATUS, UNMANNED AERIAL VEHICLE TRAFFIC MANAGEMENT METHOD, AND UNMANNED AERIAL VEHICLE SYSTEM

(71) Applicant: Rakuten Group, Inc., Tokyo (JP)

(72) Inventors: Jin Kusumi, Tokyo (JP); Norihisa Miyake, Tokyo (JP); Hayato Mizukami, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 228 days.

(21) Appl. No.: 16/652,492

(22) PCT Filed: Nov. 9, 2018

(86) PCT No.: PCT/JP2018/041624
§ 371 (c)(1),
(2) Date: Mar. 31, 2020

(87) PCT Pub. No.: WO2020/095430
PCT Pub. Date: May 14, 2020

(65) Prior Publication Data
US 2021/0225178 A1 Jul. 22, 2021

(51) Int. Cl.
G08G 5/00 (2006.01)
B64C 39/02 (2023.01)
G08G 5/02 (2006.01)

(52) U.S. Cl.
CPC ......... *G08G 5/0069* (2013.01); *B64C 39/024* (2013.01); *G08G 5/0039* (2013.01); *G08G 5/0056* (2013.01); *G08G 5/02* (2013.01)

(58) Field of Classification Search
CPC .. G08G 5/0069; G08G 5/0039; G08G 5/0056; G08G 5/02; G08G 5/0065;
(Continued)

(56) References Cited

U.S. PATENT DOCUMENTS

2013/0060405 A1* 3/2013 Komatsuzaki ......... G08G 5/006
701/3
2019/0103030 A1* 4/2019 Banga .................. G08G 5/0026
(Continued)

FOREIGN PATENT DOCUMENTS

JP 2018-045643 A 3/2018
JP 2018165115 A * 10/2018
(Continued)

OTHER PUBLICATIONS

Machine translation of reference JP 2018045643A, provided in IDS, "Unmanned Aircraft Control System, Server Device, Sign Presentation Device and Unmanned Aircraft". Last Accessed Mar. 2022 (Year: 2022).*

(Continued)

*Primary Examiner* — Isaac G Smith
*Assistant Examiner* — Jennifer M Anda
(74) *Attorney, Agent, or Firm* — Sughrue Mion, PLLC

(57) ABSTRACT

A takeoff and landing facility management apparatus 4 transmits an information request for an unmanned aerial vehicle 1 to an unmanned aerial vehicle traffic management apparatus 3 in response to receiving a landing request from the unmanned aerial vehicle 1 that asks for an emergency landing. And then, the unmanned aerial vehicle traffic management apparatus 3 transmits at least position information of the unmanned aerial vehicle 1 to the takeoff and landing facility management apparatus 4 in response to the infor-
(Continued)

mation request in a case where the unmanned aerial vehicle 1 that asks for the emergency landing is in an emergency state.

11 Claims, 10 Drawing Sheets

(58) Field of Classification Search
CPC ........ G08G 5/025; G08G 5/0013; G08G 9/00; B64C 39/024; B64C 2201/14
See application file for complete search history.

(56) References Cited

U.S. PATENT DOCUMENTS

| | | | |
|---|---|---|---|
| 2019/0212733 A1* | 7/2019 | Lan | H02P 27/08 |
| 2019/0300185 A1* | 10/2019 | Tang | G08G 5/00 |
| 2021/0005091 A1* | 1/2021 | Raabe | B64C 13/18 |

FOREIGN PATENT DOCUMENTS

| | | |
|---|---|---|
| WO | 2018/083942 A1 | 5/2018 |
| WO | 2018/155700 A1 | 8/2018 |

OTHER PUBLICATIONS

Machine translation of JP 2018165115 A (Year: 2023).*
International Search Report for PCT/JP2018/041624 dated Feb. 5, 2019 [PCT/ISA/210].

* cited by examiner

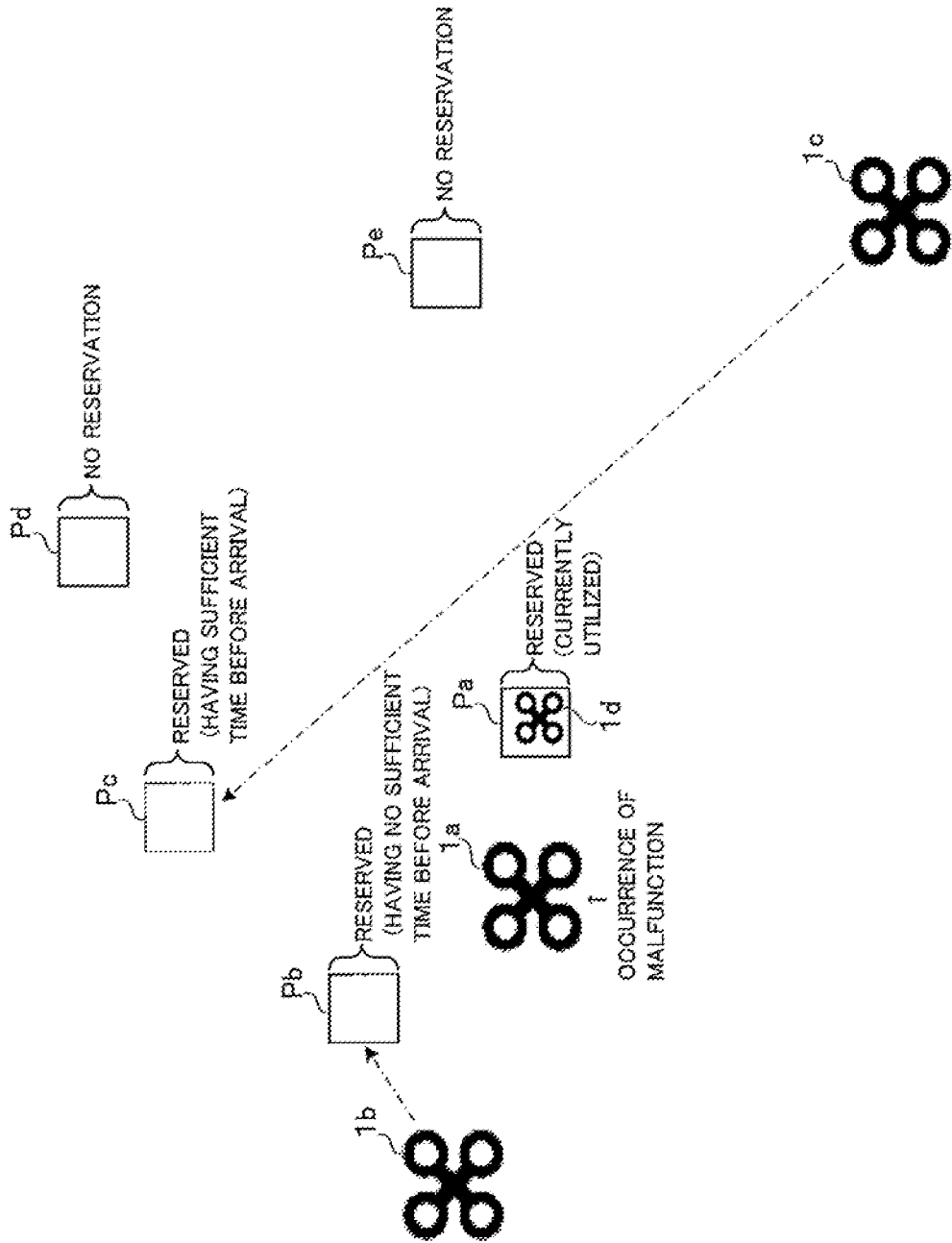

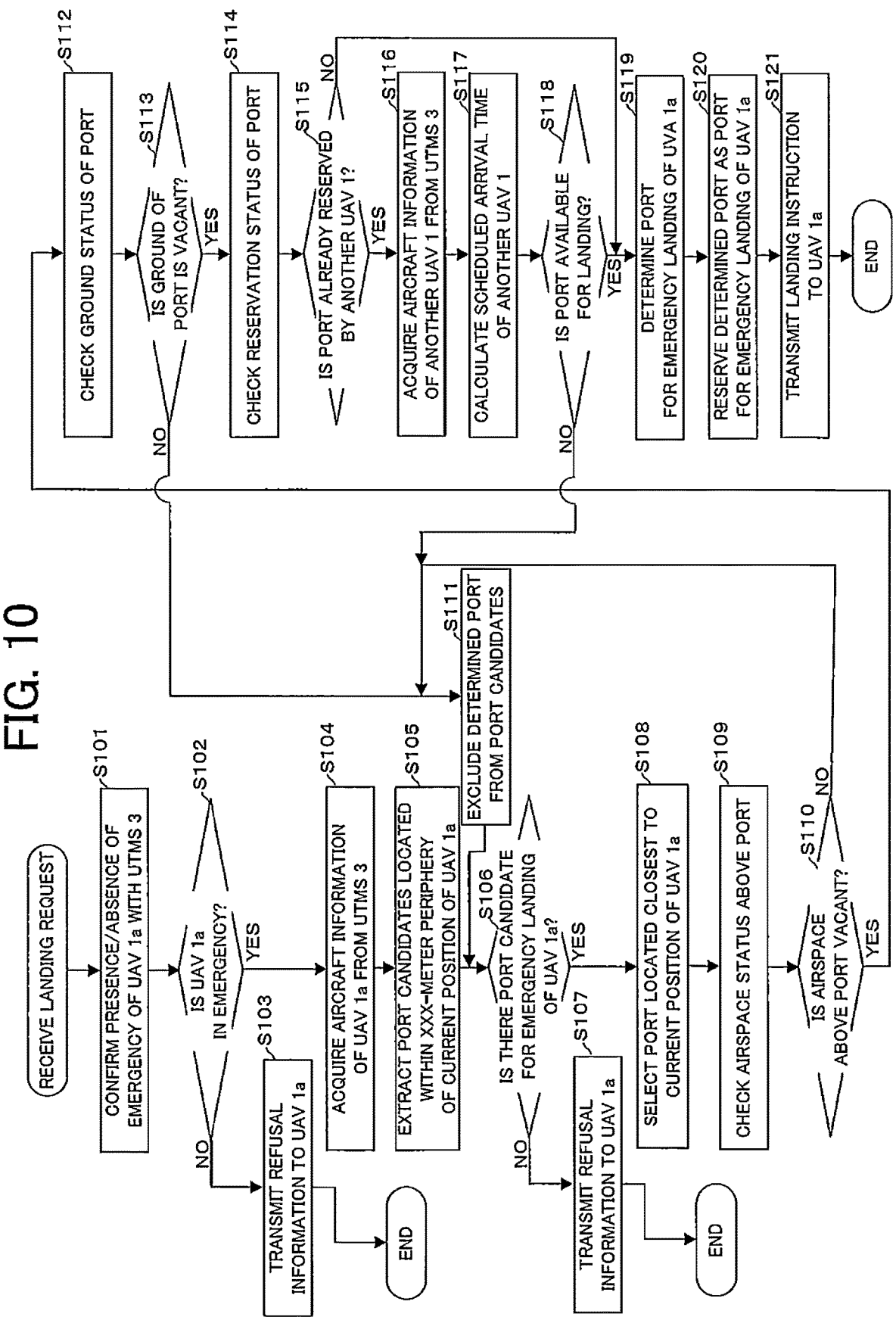

UNMANNED AERIAL VEHICLE TRAFFIC MANAGEMENT APPARATUS, TAKEOFF AND LANDING FACILITY MANAGEMENT APPARATUS, UNMANNED AERIAL VEHICLE TRAFFIC MANAGEMENT METHOD, AND UNMANNED AERIAL VEHICLE SYSTEM

CROSS REFERENCE TO RELATED APPLICATIONS

This application is a National Stage of International Application No. PCT/JP2018/041624 filed Nov. 9, 2018.

TECHNICAL FIELD

The present invention relates to a field of a system that performs traffic management for an unmanned aerial vehicle capable of performing autonomous flight.

BACKGROUND ART

In recent years, there is a known system that manages each takeoff and landing facility (also referred to as a port) where an unmanned aerial vehicle capable of performing autonomous flight takes off and lands, and also manages flight plans and flight positions of a plurality of unmanned aerial vehicles that autonomously flies between takeoff and landing facilities (for example, Patent Literature 1). According to such a system, even in a case where the plurality of unmanned aerial vehicles uses a takeoff and landing facility in common, it is possible to cope with a change in a flight plan of an unmanned aerial vehicle while ensuring safety at the takeoff and landing facility.

CITATION LIST

Patent Literature

Patent Literature 1: WO 2018/155700 A1

SUMMARY OF INVENTION

Technical Problem

By the way, in the future, it is assumed that a system that manages a takeoff and landing facility for an unmanned aerial vehicle (hereinafter referred to as a "port management system") and a system that manages a flight plan and a flight position of the unmanned aerial vehicle (hereinafter, referred to as a "traffic management system") are separated from each other independently, and the systems are operated by different operating subjects in order to achieve safe and efficient flight of the unmanned aerial vehicle. Such operation is considered desirable also from the viewpoint that takeoff and landing facilities are arranged at various places by various owners. In such operation, particularly, position information indicating a flight position of an unmanned aerial vehicle is important information from which a flight route of the unmanned aerial vehicle (for example, information corresponding to a trade secret or the like) can be identified. For that reason, there is a possibility that the position information indicating a flight position of the unmanned aerial vehicle is managed by the traffic management system side such that the position information is not provided to the outside (including the port management system).

However, in a case where any malfunction occurs during flight of an unmanned aerial vehicle, it is necessary to have the unmanned aerial vehicle make an emergency landing as promptly as possible at a takeoff and landing facility managed by the port management system. On the other hand, when position information indicating a flight position of the unmanned aerial vehicle is managed such that the position information is not provided to the outside, it is difficult to promptly have the malfunctioning unmanned aerial vehicle make an emergency landing at the takeoff and landing facility.

Therefore, one or more embodiments of the present invention have been made in view of the above circumstances, and are directed to provide an unmanned aerial vehicle traffic management apparatus, a takeoff and landing facility management apparatus, an unmanned aerial vehicle traffic management method, and an unmanned aerial vehicle system which enable prompt emergency landing of a malfunctioning unmanned aerial vehicle at a takeoff and landing facility while limiting disclosure of at least position information of the unmanned aerial vehicle.

Solution to Problem

In response to the above issue, the invention according to an aspect of the disclosure is an unmanned aerial vehicle traffic management apparatus configured to manage traffic of an unmanned aerial vehicle. The unmanned aerial vehicle traffic management apparatus includes: an information acquisition unit which acquires position information indicating a flight position of the unmanned aerial vehicle; an information management unit which manages at least the position information indicating the flight position of the unmanned aerial vehicle as information strictly confidential to the outside except for a time of emergency; a traffic processing unit which performs processing related to traffic management of the unmanned aerial vehicle; a request reception unit which receives, from a takeoff and landing facility management apparatus, a request for information of the unmanned aerial vehicle that asks for an emergency landing, the takeoff and landing facility management apparatus managing a takeoff and landing facility for an unmanned aerial vehicle; and a transmission control unit which performs transmission control of aircraft information such that the aircraft information including the position information indicating the flight position of the unmanned aerial vehicle that asks for the emergency landing is provided to the takeoff and landing facility management apparatus in response to the request from the takeoff and landing facility management apparatus in a case where the unmanned aerial vehicle that asks for the emergency landing is in an emergency state. Accordingly, it is possible to promptly have a malfunctioning unmanned aerial vehicle make the emergency landing at the takeoff and landing facility while limiting disclosure of at least position information of the unmanned aerial vehicle.

The invention according to an aspect of the disclosure is the unmanned aerial vehicle traffic management apparatus, wherein the request reception unit receives, together with the request, identification information of the unmanned aerial vehicle that asks for the emergency landing, and the apparatus further includes: an alarm reception unit which receives the identification information of the unmanned aerial vehicle together with an alarm from the unmanned aerial vehicle that asks for the emergency landing; and a determination unit which determines that the unmanned aerial vehicle that asks for the emergency landing is in the emergency state in a case where the identification information received by the request reception unit coincides with the identification information received by the alarm reception unit. This makes it possible to ensure reliability in determining that the unmanned aerial vehicle that asks for the emergency landing is in the emergency state.

The invention according to an aspect of the disclosure is the unmanned aerial vehicle traffic management apparatus, wherein the request reception unit receives a request for information of another unmanned aerial vehicle that has reserved the takeoff and landing facility to be a candidate for the emergency landing of the unmanned aerial vehicle that asks for the emergency landing, and in a case where the unmanned aerial vehicle that asks for the emergency landing is in the emergency state, the transmission control unit performs the transmission control for aircraft information such that the aircraft information including position information indicating a flight position of the other unmanned aerial vehicle is provided to the takeoff and landing facility management apparatus in response to the request from the takeoff and landing facility management apparatus. According to this configuration, even when the takeoff and landing facility is reserved by the other unmanned aerial vehicle, as far as there is a sufficient time before arrival of the other unmanned aerial vehicle, the takeoff and landing facility can be determined as a takeoff and landing facility for the emergency landing of the unmanned aerial vehicle that asks for the emergency landing.

The invention according to an aspect of the disclosure is the unmanned aerial vehicle traffic management apparatus, wherein the traffic processing unit manages a flight status of the unmanned aerial vehicle in accordance with the aircraft information of the unmanned aerial vehicle. According to this configuration, the unmanned aerial vehicle traffic management apparatus can perform air traffic control for unmanned aerial vehicles.

The invention according to an aspect of the disclosure is the unmanned aerial vehicle traffic management apparatus, wherein in a case where the unmanned aerial vehicle that asks for the emergency landing is in the emergency state, the traffic processing unit changes a flight plan of the other unmanned aerial vehicle that has reserved the takeoff and landing facility to be a candidate for the emergency landing of the unmanned aerial vehicle that asks for the emergency landing. This makes it possible to provide the unmanned aerial vehicle that asks for the emergency landing with the takeoff and landing facility available for landing of the unmanned aerial vehicle.

The invention according to an aspect of the disclosure is a takeoff and landing facility management apparatus configured to manage a takeoff and landing facility for an unmanned aerial vehicle. The takeoff and landing facility management apparatus includes: a request transmission unit which transmits, to an unmanned aerial vehicle traffic management apparatus configured to manage traffic of the unmanned aerial vehicle, a request for information of the unmanned aerial vehicle that asks for an emergency landing; an information reception unit which receives aircraft information provided in response to the request and including position information indicating the flight position of the unmanned aerial vehicle that asks for the emergency landing; and a facility determination unit which determines, on the basis of the aircraft information of the unmanned aerial vehicle that asks for the emergency landing, a takeoff and landing facility for the emergency landing of the unmanned aerial vehicle that asks for the emergency landing. Accordingly, it is possible to promptly have a malfunctioning unmanned aerial vehicle make the emergency landing at the takeoff and landing facility while limiting disclosure of at least position information of the unmanned aerial vehicle.

The invention according to an aspect of the disclosure is the takeoff and landing facility management apparatus further comprising an instruction transmission unit which transmits, to the unmanned aerial vehicle that asks for the emergency landing, a landing instruction to land at the takeoff and landing facility determined by the facility determination unit. This makes it possible to promptly guide the unmanned aerial vehicle that has fallen in the emergency state to the takeoff and landing facility for the emergency landing.

The invention according to an aspect of the disclosure is the takeoff and landing facility management apparatus, further comprising a state confirmation unit which confirms, with the unmanned aerial vehicle traffic management apparatus, whether or not the unmanned aerial vehicle that asks for the emergency landing is in an emergency state, wherein in a case where it is confirmed by the state confirmation unit that the unmanned aerial vehicle that asks for the emergency landing is in the emergency state, the request transmission unit transmits, to the unmanned aerial vehicle traffic management apparatus, a request for information of the unmanned aerial vehicle that asks for the emergency landing. According to this configuration, when the takeoff and landing facility management apparatus requests information of the unmanned aerial vehicle that asks for the emergency landing, the apparatus can promptly obtain the aircraft information of the unmanned aerial vehicle.

The invention according to an aspect of the disclosure is the takeoff and landing facility management apparatus further comprising a facility candidate extraction unit which extracts, from among a plurality of the takeoff and landing facilities, the takeoff and landing facility located within a predetermined range from the flight position of the unmanned aerial vehicle that asks for the emergency landing as a candidate of a takeoff and landing facility for the emergency landing of the unmanned aerial vehicle that asks for the emergency landing. This makes it possible to determine a takeoff and landing facility for the emergency landing of the unmanned aerial vehicle that asks for the emergency landing, from among candidates of takeoff and landing facilities located closer to the flight position of the unmanned aerial vehicle.

The invention according to an aspect of the disclosure is the takeoff and landing facility management apparatus further comprising a reservation presence/absence determination unit which determines whether or not the candidate of the takeoff and landing facility extracted by the facility candidate extraction unit is reserved by another unmanned aerial vehicle, wherein in a case where the reservation presence/absence determination unit determines that no reservation is made, the facility determination unit determines the candidate of the takeoff and landing facility as a takeoff and landing facility for the emergency landing of the unmanned aerial vehicle that asks for the emergency landing. This makes it possible to determine a takeoff and landing facility not reserved by the other unmanned aerial vehicle as the takeoff and landing facility for the emergency landing of the unmanned aerial vehicle that asks for the emergency landing.

The invention according to an aspect of the disclosure is the takeoff and landing facility management apparatus further comprising a reservation presence/absence determination unit which determines whether or not the candidate of the takeoff and landing facility extracted by the facility candidate extraction unit is reserved by another unmanned aerial vehicle, wherein in a case where the reservation presence/absence determination unit determines that reservation is made, the request transmission unit transmits a request for information of the other unmanned aerial vehicle to the unmanned aerial vehicle traffic management apparatus, the information reception unit receives aircraft information provided in response to the request and including position information indicating a flight position of the other unmanned aerial vehicle, and the facility determination unit determines, on the basis of the aircraft information of the other unmanned aerial vehicle, whether or not the candidate of the takeoff and landing facility reserved by the other unmanned aerial vehicle is available for landing, and in a case of determining that the candidate of the takeoff and landing facility is available for landing, the facility determination unit determines the candidate of the takeoff and landing facility as a takeoff and landing facility for the emergency landing of the unmanned aerial vehicle that asks for the emergency landing. According to this configuration, even when the takeoff and landing facility is reserved by the other unmanned aerial vehicle, the takeoff and landing facility can be determined as the takeoff and landing facility for the emergency landing of the unmanned aerial vehicle that asks for the emergency landing.

The invention according to an aspect of the disclosure is the takeoff and landing facility management apparatus, wherein the facility determination unit determines, on the basis of scheduled arrival time identified by the aircraft information of the other unmanned aerial vehicle, whether or not the candidate of the takeoff and landing facility is available for landing. According to this configuration, even when the takeoff and landing facility is reserved by the other unmanned aerial vehicle, as far as there is a sufficient time before arrival of the other unmanned aerial vehicle, the takeoff and landing facility can be determined as a takeoff and landing facility for the emergency landing of the unmanned aerial vehicle that asks for the emergency landing.

The invention according to an aspect of the disclosure is the takeoff and landing facility management apparatus further comprising a reservation processing unit which performs processing of reserving a new a takeoff and landing facility for landing of the other unmanned aerial vehicle in a case where the takeoff and landing facility reserved by the other unmanned aerial vehicle is determined as a takeoff and landing facility for the emergency landing of the unmanned aerial vehicle that asks for the emergency landing. This makes it possible to automatically reserve a new takeoff and landing facility without making an operator of the other unmanned aerial vehicle reserve a new takeoff and landing facility.

The invention according to an aspect of the disclosure is an unmanned aerial vehicle system includes: an unmanned aerial vehicle traffic management apparatus configured to manage traffic of an unmanned aerial vehicle; and a takeoff and landing facility management apparatus configured to manage a takeoff and landing facility for an unmanned aerial vehicle. The unmanned aerial vehicle traffic management apparatus includes: an information acquisition unit which acquires position information indicating a flight position of the unmanned aerial vehicle; and an information management unit which manages at least the position information indicating the flight position of the unmanned aerial vehicle as information strictly confidential to the outside except for a time of emergency. The unmanned aerial vehicle includes a landing request unit which requests the takeoff and landing facility management apparatus to allow an emergency landing in a case of detecting malfunction. The takeoff and landing facility management apparatus includes a request transmission unit which transmits, to the unmanned aerial vehicle traffic management apparatus, a request for information of the unmanned aerial vehicle that asks for the emergency landing. The unmanned aerial vehicle traffic management apparatus further includes: a request reception unit which receives, from the takeoff and landing facility management apparatus, the request for the information of the unmanned aerial vehicle that asks for the emergency landing; and a transmission control unit which performs transmission control for aircraft information such that the aircraft information including the position information indicating the flight position of the unmanned aerial vehicle that asks for the emergency landing is provided to the takeoff and landing facility management apparatus in response to the request from the takeoff and landing facility management apparatus in a case where the unmanned aerial vehicle that asks for the emergency landing is in an emergency state. The takeoff and landing facility management apparatus further includes: an information reception unit which receives the aircraft information provided in response to the request and related to the unmanned aerial vehicle that asks for the emergency landing; a facility determination unit which determines, on the basis of the aircraft information of the unmanned aerial vehicle that asks for the emergency landing, a takeoff and landing facility for the emergency landing of the unmanned aerial vehicle that asks for the emergency landing; and an instruction transmission unit which transmits, to the unmanned aerial vehicle that asks for the emergency landing, a landing instruction to land at the takeoff and landing facility determined by the facility determination unit.

The invention according to an aspect of the disclosure is an unmanned aerial vehicle traffic management apparatus configured to manage traffic of an unmanned aerial vehicle. The unmanned aerial vehicle traffic management apparatus includes: an information acquisition unit which acquires position information indicating a flight position of the unmanned aerial vehicle; an information management unit which manages at least the position information indicating the flight position of the unmanned aerial vehicle as information strictly confidential to the outside except for a time of emergency; a request reception unit which receives, from a takeoff and landing facility management apparatus, a request for information of the unmanned aerial vehicle that asks for an emergency landing, the takeoff and landing facility management apparatus managing a takeoff and landing facility for an unmanned aerial vehicle; and a transmission control unit which performs transmission control for aircraft information such that the aircraft information including the position information indicating the flight position of the unmanned aerial vehicle that asks for the emergency landing is provided to the takeoff and landing facility management apparatus in response to the request from the takeoff and landing facility management apparatus in a case where the unmanned aerial vehicle that asks for the emergency landing is in an emergency state.

The invention according to an aspect of the disclosure is an unmanned aerial vehicle traffic management method executed by a computer that manages traffic of an unmanned aerial vehicle. The unmanned aerial vehicle traffic management method includes: a step of acquiring position information indicating a flight position of the unmanned aerial vehicle; a step of managing at least the position information indicating the flight position of the unmanned aerial vehicle as information strictly confidential to the outside except for a time of emergency; a step of receiving, from a takeoff and landing facility management apparatus, a request for information of the unmanned aerial vehicle that asks for an emergency landing, the takeoff and landing facility management apparatus managing a takeoff and landing facility for an unmanned aerial vehicle; and a step of performing transmission control for aircraft information such that the aircraft information including the position information indicating the flight position of the unmanned aerial vehicle that asks for the emergency landing is provided to the takeoff and landing facility management apparatus in response to the request from the takeoff and landing facility management apparatus in a case where the unmanned aerial vehicle that asks for the emergency landing is in an emergency state.

Advantageous Effect of the Invention

According to one or more embodiments of the present invention, it is possible to promptly have a malfunctioning unmanned aerial vehicle make the emergency landing at the takeoff and landing facility while limiting disclosure of at least position information of the unmanned aerial vehicle.

BRIEF DESCRIPTION OF THE DRAWINGS

FIG. 9 is a conceptual diagram illustrating reservation statuses of respective ports Pa to Pe arranged within an xxx-meter periphery from a current position of the malfunctioning UAV 1a.

FIG. 10 is a flowchart illustrating a specific example of a processing of the PMS 4 in FIG. 8.

DESCRIPTION OF EMBODIMENTS

Hereinafter, an unmanned aerial vehicle system according to an embodiment of the present invention will be described with reference to the drawings. Incidentally, the embodiment described below is an embodiment of a case where an unmanned aerial vehicle traffic management apparatus is applied to a traffic management system, and a takeoff and landing facility management apparatus is applied to a port management system.

[1. Outline of Configuration and Functions of Unmanned Aerial Vehicle System S]

Figure 1:
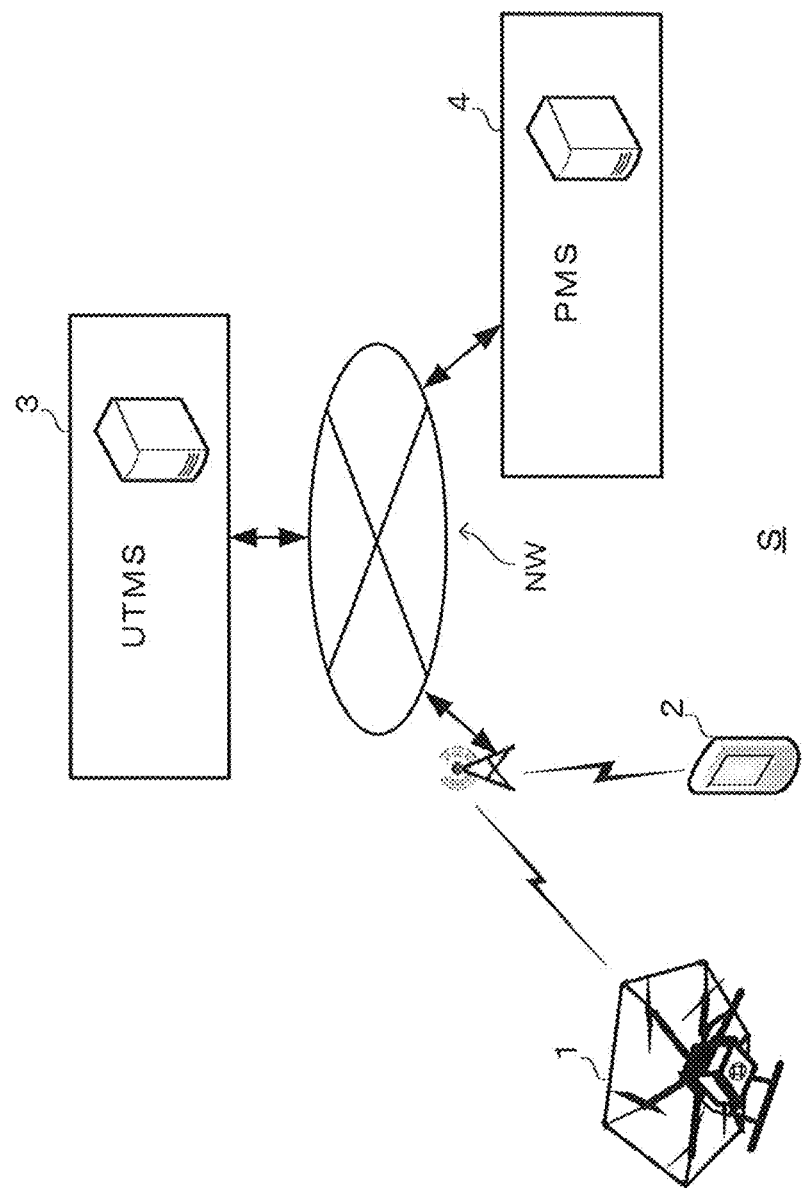
FIG. 1 is a diagram illustrating a schematic configuration example of an unmanned aerial vehicle system S.

First, an outline of a configuration and functions of an unmanned aerial vehicle system S according to the present embodiment will be described with reference to FIG. 1. FIG. 1 is a diagram illustrating a schematic configuration example of the unmanned aerial vehicle system S. As illustrated in FIG. 1, the unmanned aerial vehicle system S includes: a plurality of unmanned aerial vehicles (hereinafter, each referred to as an "UAV (Unmanned Aerial Vehicle)s") 1, an unmanned aerial system operator (referred to as an "UASO (Unmanned Aerial System Operator)") 2, a traffic management system (referred to as a "UTMS (UAV Traffic Management System)") 3, and a port management system (hereinafter, referred to as a "PMS (Port Management System)") 4. The UAV 1, the UASO 2, the UTMS 3, and the PMS 4 can communicate with one another via a communication network NW. The communication network NW includes, for example, the Internet, a mobile communication network, a radio base station thereof, and the like.

The UAV 1 can fly by remote control or can fly autonomously in the atmosphere. The UAV 1 is also called a drone or a multi-copter. The UASO 2 is an operator of a GCS (Ground Control Station) capable of managing the UAV 1 and remotely controlling the UAV 1. The GCS is installed as an application in a control terminal that can be connected to the communication network NW. In this case, the operator is a user who uses: a controller included in the control terminal; or the control terminal. Alternatively, the GCS may be systemized by a server or the like. In this case, the operator is an administrator of the controller included in the server or the system. Incidentally, in the example of FIG. 1, one UAV 1 and one UASO 2 are illustrated respectively, but there is an assumed case of having a plurality of UAVs 1 (1a, 1b, . . . ) and a plurality of UASOs 2 (2a, 2b, . . . ) in the following description. One UASO 2 may manage one UAV 1 (that is, one-to-one correspondence), or one UASO 2 may manage a plurality of UAVs 1 (that is, one-to-N correspondence).

The UTMS 3 includes one or a plurality of servers. The UTMS 3 manages traffic and flight of the UAV 1. The traffic management for the UAV 1 includes: management of a traffic plan before flight of the UAV 1; and control of a flight status of the UAV 1 in flight. Here, the traffic plan before the flight of the UAV 1 is a flight plan including a scheduled route where the UAV 1 flies, and the like. The flight plan may also include: a scheduled passage time at each point on the scheduled route; and scheduled landing time. The flight plan of the UAV 1 is prepared by, for example, the UASO 2 that manages the UAV 1 and applied to the UTMS 3 (hereinafter, referred to as "flight plan application"). Moreover, a flight status of the UAV 1 currently in flight is managed on the basis of aircraft information of the UAV 1. The aircraft information of the UAV 1 includes at least position information of the UAV 1. The position information of the UAV 1 indicates a current position (for example, latitude, longitude, and altitude) of the UAV 1. The current position of the UAV 1 is a flight position of the UAV 1 currently in flight. Here, the aircraft information of the UAV 1 may also include speed information of the UAV 1, status information of the UAV 1, and the like. The speed information of the UAV 1 indicates a flight speed of the UAV 1. The status information of the UAV 1 indicates, for example, whether or not the UAV 1 is in an emergency state. The emergency state represents, for example, a state where it is difficult to keep normal flight due to occurrence of malfunction in the UAV 1. The aircraft information of the UAV 1 is managed as information strictly confidential to the outside (including the PMS 4) except when the UAV 1 is in emergency. The time when the UAV 1 is in emergency represents a time during which the UAV 1 is in the emergency state. That is, in a case where the emergency state continues, the time during which the emergency state continues is to be a time of emergency. Conversely, "except when the UAV 1 is in emergency" (hereinafter, referred to as "normal time") represents a time during which the UAV 1 is in a state (normal state) capable of keeping the normal flight.

The PMS 4 includes one or a plurality of servers and the like. The PMS 4 and the UTMS 3 are separated from each other independently and operated by, for example, an operating subject different from that of the UTMS 3. The PMS 4 manages a takeoff and landing facility (hereinafter, referred to as "port") of a UAV. Each port is managed on the basis of port position information, port reservation information, and the like. Here, the port position information indicates an installation position of the port. The port reservation information includes: an aircraft ID of the UAV 1 that has reserved the port (landing reservation); an operator ID of the UASO 2 that manages the UAV 1; reservation date and time; and the like. The aircraft ID of the UAV 1 is identification information to identify the UAV 1. The operator ID of the UASO 2 is identification information to identify the UASO 2. Reservation of a port used by each UAV 1 is requested to the PMS 4 by, for example, the UASO 2 that manages the UAV 1. Incidentally, one PMS 4 may manage one port (that is, one-to-one correspondence), or one PMS 4 may manage a plurality of ports (that is, one-to-N correspondence). In the case where the one PMS 4 manages one port, a plurality of sets (combinations) each including the PMS 4 and a port are provided. Alternatively, there may be a plurality of PMSs 4. In this case, the plurality of PMSs 4 manages one or a plurality of ports.

[1-1. Outline of Configuration and Functions of UAV 1]

Figure 2:
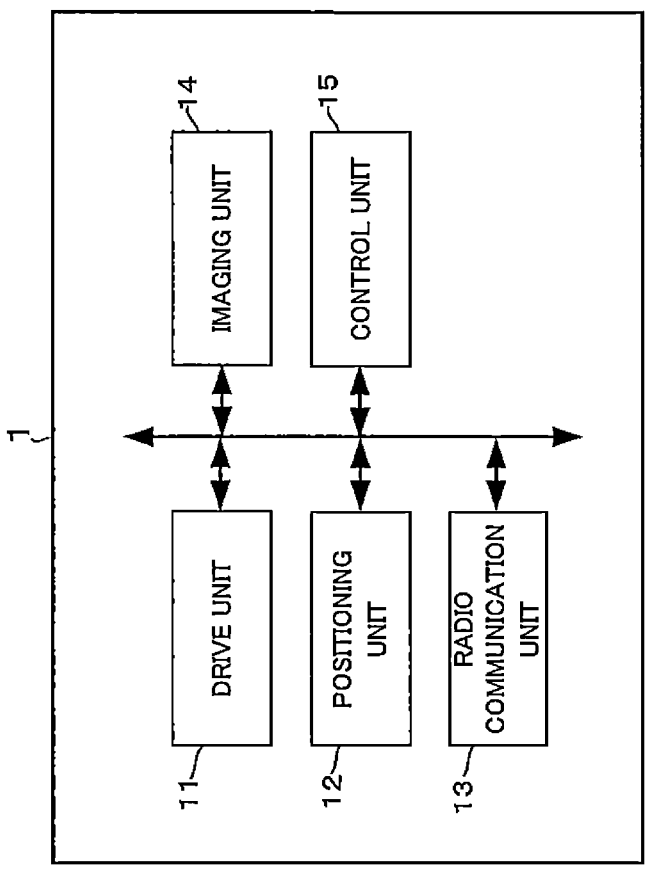
FIG. 2 is a diagram illustrating a schematic configuration example of an UAV 1.

Next, an outline of a configuration and functions of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a radio communication unit 13, an imaging unit 14, a control unit 15, and the like. Incidentally, although not illustrated, the UAV 1 includes a rotor (propeller) that is a horizontal rotary blade, various sensors, a battery that supplies power to each of the units of the UAV 1, and the like. The various sensors used for flight control of the UAV 1 include a barometric sensor, a three-axis acceleration sensor, a geomagnetic sensor, and the like. Detection information detected by the various sensors is output to the control unit 15. The detection information detected by the barometric sensor is used to calculate the flight speed of the UAV 1.

The drive unit 11 includes a motor, a rotating shaft, and the like. The drive unit 11 rotates a plurality of rotors by a motor, a rotating shaft, and the like that are driven in accordance with a control signal output from the control unit 15. The positioning unit 12 includes a radio receiver, an altitude sensor, and the like. For example, the positioning unit 12 receives, by the radio receiver, a radio wave sent from a satellite of a GNSS (Global Navigation Satellite System) and detects a current position (latitude and longitude) of the UAV 1 in a horizontal direction on the basis of the radio wave. Incidentally, the current position in the horizontal direction of the UAV 1 may be corrected on the basis of an image captured by the imaging unit 14 or a radio wave sent from the radio base station.

Further, the positioning unit 12 may detect the current position (altitude) in a vertical direction of the UAV 1 with the altitude sensor. The position information indicating the current position detected by the positioning unit 12 is output to the control unit 15. Incidentally, the position information of the UAV 1 can be applied to the present embodiment even in a case where the position information indicates the current position (latitude and longitude) in the horizontal direction of the UAV 1 (that is, two-dimensional position information). The radio communication unit 13 controls communication performed via the communication network NW. The imaging unit 14 includes a camera or the like. The imaging unit 14 continuously captures images of a real space within a range included within an angle of view of the camera (a periphery of the UAV 1). Image information captured by the imaging unit 14 is output to the control unit 15.

The control unit 15 includes: a central processing unit (CPU) that is a processor; a read only memory (ROM); a random access memory (RAM); a non-volatile memory; and the like. Incidentally, the control unit 15 has a function of a landing request unit. The control unit 15 executes various kinds of control for the UAV 1 in accordance with a control program (program code group) stored in, for example, the ROM or the non-volatile memory. The various kinds of control include takeoff control, flight control, and landing control.

In the flight control and the landing control, the position information acquired from the positioning unit 12, the image information acquired from the imaging unit 14, the detection information acquired from the various sensors, and flight plan information indicating a pre-registered flight plan are used to control a rotation speed of the rotor, and a position, a posture, and a traveling direction of the UAV 1. According to this configuration, the UAV 1 can fly autonomously from a departure place to a port. Incidentally, the control unit 15 can also perform the flight control in accordance with an instruction signal from the UASO 2. Additionally, during the flight of the UAV 1, the control unit 15 periodically transmits, to the UTMS 3, the aircraft information of the UAV 1 together with the aircraft ID of the UAV 1 via the radio communication unit 13. At this time, the operator ID of the UASO 2 that manages UAV 1 may also be transmitted to UTMS 3. Incidentally, the aircraft ID and the aircraft information of the UAV 1 may also be transmitted from the UAV 1 to the UTMS 3 via the UASO 2 (GCS).

Moreover, the control unit 15 performs self-diagnosis in order to detect malfunction of the UAV 1 in accordance with a self-diagnosis program stored in, for example, the ROM or the non-volatile memory. It is preferable that this self-diagnosis be executed repeatedly during the flight of UAV 1. Detailed content of malfunction is not particularly limited, but examples thereof may include malfunction at a drive system, a power supply system, or the like. In a case of detecting any malfunction through the self-diagnosis, the control unit 15 transmits, to the PMS 4, a landing request to ask for an emergency landing, together with the aircraft ID of the malfunctioning UAV 1. Incidentally, the landing request may also be transmitted from the UAV 1 to the PMS 4 via the UASO 2 (GCS).

Moreover, in the case of detecting any malfunction through the self-diagnosis, the control unit 15 may transmit an alarm to the UTMS 3 together with the aircraft ID of the malfunctioning UAV 1. Incidentally, the alarm may be transmitted from the UAV 1 to the UTMS 3 via the UASO 2 (GCS). Moreover, in a case where the normal flight can be kept even in the occurrence of malfunction, the landing request and the alarm may not be necessarily transmitted. Then, in a case of receiving a landing instruction to land at a specific port from the PMS 4 in response to the landing request, the control unit 15 performs control to make an emergency landing at the port. Incidentally, the landing instruction may also be transmitted from the PMS 4 to the UAV 1 via the UASO 2 (GCS).

[1-2. Outline of Configuration and Functions of UTMS 3]

Figure 3:
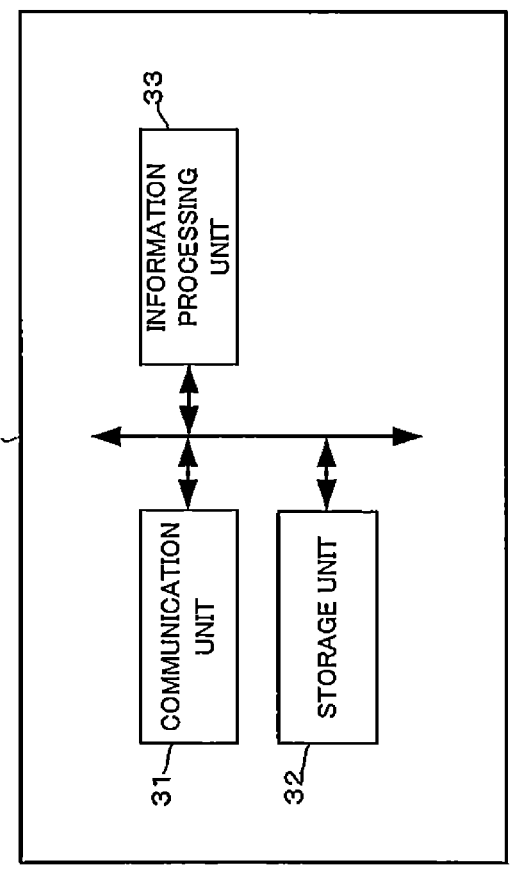
FIG. 3 is a diagram illustrating a schematic configuration example of an UTMS 3.
Figure 4:
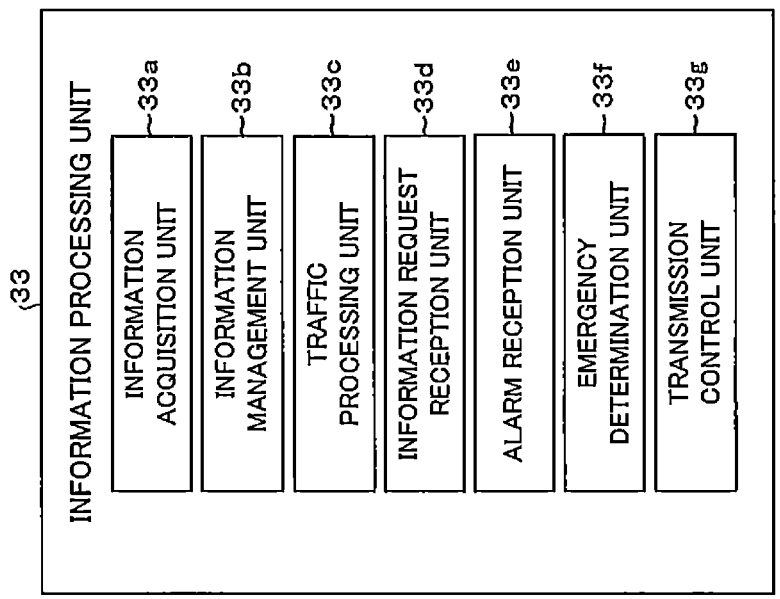
FIG. 4 is a diagram illustrating exemplary functional blocks in an information processing unit 33.

Next, an outline of a configuration and functions of the UTMS 3 will be described with reference to FIGS. 3 and 4. FIG. 3 is a diagram illustrating a schematic configuration example of the UTMS 3. As illustrated in FIG. 3, the UTMS 3 includes a communication unit 31, a storage unit 32, an information processing unit 33, and the like. The communication unit 31 controls communication performed via the communication network NW. The storage unit 32 includes, for example, a hard disk drive, and the like. The storage unit 32 stores, for each of the plurality of UAVs 1, the aircraft ID of the UAV 1 and the flight plan information indicating the flight plan of the UAV 1 in a manner correlated to each other. Incidentally, the operator ID of the UASO 2 that manages the UAV 1 may also be stored in a manner correlated to the flight plan information of the UAV 1. Moreover, the storage unit 32 stores, for each of the plurality of UAVs 1, the aircraft ID of the UAV 1 and aircraft information of the UAV 1 in a manner correlated to each other. Incidentally, the operator ID of the UASO 2 that manages the UAV 1 may also be stored in a manner correlated to the aircraft information of the UAV 1.

The information processing unit 33 includes a CPU that is a processor, a ROM, a RAM, a non-volatile memory, and the like. FIG. 4 is a diagram illustrating exemplary functional blocks in the information processing unit 33. As illustrated in FIG. 4, the information processing unit 33 functions, for example, in accordance with a program stored in the ROM or the non-volatile memory, as an information acquisition unit 33a, an information management unit 33b, a traffic processing unit 33c, an information request reception unit 33d, and an alarm reception unit 33e, an emergency determination unit 33f, and a transmission control unit 33g.

The information acquisition unit 33a periodically acquires the aircraft ID and the aircraft information of the UAV 1 from the UAV 1 or the UASO 2. Incidentally, the information acquisition unit 33a may acquire the operator ID of the UASO 2 that manages the UAV 1 in addition to the aircraft ID and the aircraft information of the UAV 1. Moreover, the information acquisition unit 33a acquires the aircraft ID and flight plan information of the UAV 1 at the time of flight plan application from the UASO 2 that manages the UAV 1, for example.

The information management unit 33b utilizes the storage unit 32 to manage, for each of the plurality of UAVs 1, the aircraft ID of the UAV 1, the operator ID of the UASO 2 that manages the UAV 1, flight plan information of the UAV 1, and aircraft information of the UAV 1. Among such information, particularly the aircraft information of the UAV 1 (at least position information of the UAV 1) acquired by the information acquisition unit 33a is managed as sensitive information strictly confidential to the outside except when the UAV 1 is in emergency (that is, provision of the sensitive information to outside is restricted). Therefore, the aircraft information of the UAV 1 is not provided to the PMS 4 or the like at the normal time of UAV 1.

The traffic processing unit 33c performs processing (also including controlling other devices) related to the traffic management of the plurality of UAVs 1. For example, in a case where the flight plan application is made from the UASO 2, the traffic processing unit 33c determines whether or not the flight plan indicated by the flight plan information satisfies predetermined criteria, and in a case where the flight plan satisfies the predetermined criteria, the traffic processing unit 33c approves the flight plan. Moreover, the traffic processing unit 33c manages the flight status of the UAV 1 in accordance with the aircraft information of the UAV 1 acquired by the information management unit 33b, and performs air traffic control such as giving information and an instruction to the UAV 1, or the like. Examples of the information given to the UAV 1 include information of a safe flight route, information of a flight available area, and the like. Incidentally, in a case where the UAV 1 that asks for the emergency landing is in the emergency state, the traffic processing unit 33c may change the flight plan of another (different) UAV 1 that has reserved a port that becomes a candidate for the emergency landing of the UAV 1 that asks for the emergency landing. Since the flight plan of the other UAV 1 is changed, the port available for landing of the UAV 1 that asks for the emergency landing can be provided to the UAV 1. Examples of changing the flight plan include changing a scheduled route, changing scheduled landing time, and the like. In the case of changing the scheduled route, for example, a change instruction to change the port reserved by the other UAV 1 is transmitted from the UTMS 3 to the PMS 4, and then position information of the port for which the change has been made by the PMS 4 is transmitted from the PMS 4 to the other UAV 1 or the UASO 2 that manages the same. On the other hand, in the case of changing the scheduled landing time, for example, a waiting instruction to make the other UAV 1 wait for landing (wait by hovering or the like) is transmitted via the PMS 4 from the UTMS 3 to the other UAV 1 or the UASO 2 that manages the same. Such a flight plan change may also be made in a case where the PMS 4 cannot find any port available for landing of the UAV 1 that asks for the emergency landing.

The information request reception unit 33d receives, from the PMS 4, a request for information (hereinafter, referred to as "information request"), in particular position information, of the UAV 1 that asks for the emergency landing, together with the aircraft ID of the UAV 1 that asks for the emergency landing. Incidentally, there is a case where the information request reception unit 33d receives, from the PMS 4, the information request for another UAV 1 that has reserved a port that becomes a candidate for the emergency landing of the UAV 1 that asks for the emergency landing. In this case, the aircraft ID of the other UAV 1 is received together with the information request. The alarm reception unit 33e receives, from the UAV 1 or the UASO 2, an alarm together with the aircraft ID of the UAV 1 that asks for the emergency landing.

In response to the information request received by the information request reception unit 33d, the emergency determination unit 33f determines whether or not the UAV 1 that asks for the emergency landing is in the emergency state (in other words, determines presence/absence of emergency). For example, in a case where the aircraft ID received by the information request reception unit 33d coincides with the aircraft ID received from the alarm reception unit 33e, the emergency determination unit 33f determines that the UAV 1 that asks for the emergency landing is in the emergency state. Incidentally, whether or not the UAV 1 is in the emergency state may also be determined by a system other than the UTMS 3.

In a case where the UAV 1 that asks for the emergency landing is in the emergency state (for example, in a case where the emergency determination unit 33f determines that the UAV 1 is in the emergency state), the transmission control unit 33g performs transmission control for aircraft information such that the aircraft information (including at least position information of the UAV 1) of the UAV 1 that asks for the emergency landing is provided to the PMS 4 in response to the information request from the PMS 4. With this transmission control for the aircraft information of the UAV 1, the UTMS 3 transmits the aircraft information to the PMS 4, or the UTMS 3 instructs the UAV 1 or the UASO 2 to transmit the aircraft information to the PMS 4.

[1-3. Outline of Configuration and Functions of PMS 4]

Figure 5:
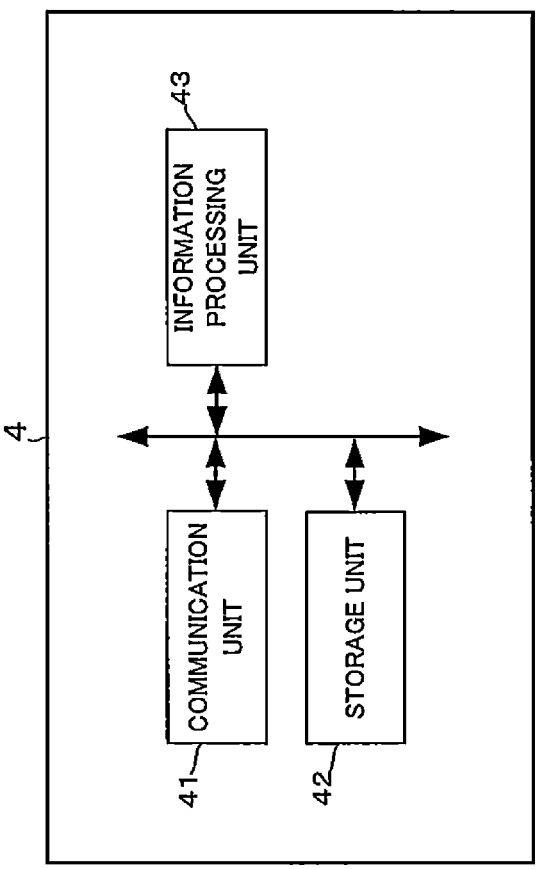
FIG. 5 is a diagram illustrating a schematic configuration example of a PMS 4.
Figure 6:
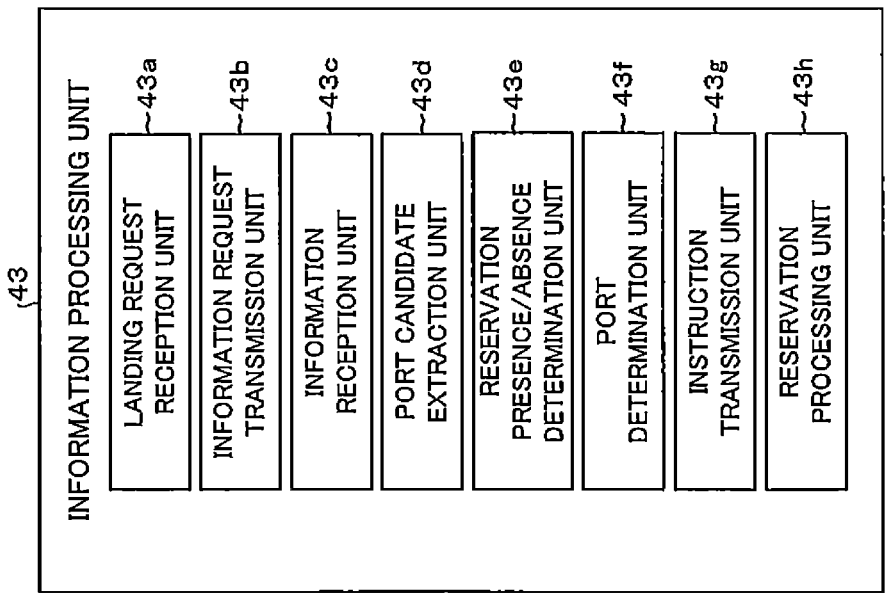
FIG. 6 is a diagram illustrating exemplary functional blocks in an information processing unit 43.

Next, an outline of a configuration and functions of the PMS 4 will be described with reference to FIGS. 5 and 6. FIG. 5 is a diagram illustrating a schematic configuration example of the PMS 4. As illustrated in FIG. 5, the PMS 4 includes a communication unit 41, a storage unit 42, an information processing unit 43, and the like. The communication unit 41 controls communication performed via the communication network NW. The storage unit 42 includes, for example, a hard disk drive and the like. The storage unit 42 stores, for each of the plurality of ports, a port ID of the port, position information of the port, and reservation information of the port in a manner correlated to one another. The port ID is identification information that identifies the port.

The information processing unit 43 includes a CPU that is a processor, a ROM, a RAM, a non-volatile memory, and the like. FIG. 6 is a diagram illustrating exemplary functional blocks in the information processing unit 43. As illustrated in FIG. 6, the information processing unit 43 functions, in accordance with a program stored in the ROM or the non-volatile memory, as a landing request reception unit 43a, an information request transmission unit 43b, an information reception unit 43c, a port candidate extraction unit (facility candidate extraction unit) 43d, a reservation presence/absence determination unit 43e, a port determination unit (facility determination unit) 43f, an instruction transmission unit 43g, and a reservation processing unit 43h. Incidentally, the information request transmission unit 43b may have a function of a state confirmation unit.

The landing request reception unit 43a receives a landing request from the UAV 1 or the UASO 2 together with the aircraft ID of the UAV 1 that asks for the emergency landing. In response to the landing request received by the landing request reception unit 43a, the information request transmission unit 43b transmits, to the UTMS 3, the information request for the UAV 1 that asks for the emergency landing, together with the aircraft ID of the UAV 1 that asks for the emergency landing. Incidentally, the information request transmission unit 43b confirms, with the UTMS 3, whether or not the UAV 1 that asks for the emergency landing is in the emergency state (in other words, confirms presence/absence of emergency), and in a case where it is confirmed that the UAV 1 is in the emergency state, the information request transmission unit 43b may transmit, to the UTMS 3, the information request for the UAV 1 that asks for the emergency landing.

The information reception unit 43c receives the aircraft information of UAV 1 that asks for the emergency landing when the aircraft information is provided in response to the information request to the UTMS 3. The port candidate extraction unit 43d extracts, from among the plurality of ports managed by the PMS 4, ports located within a predetermined range from a current position of the UAV 1 that asks for the emergency landing (for example, within an xxx-meter periphery from the current position) as port candidates for the emergency landing of the UAV 1. The reservation presence/absence determination unit 43e determines whether or not each of the port candidates extracted by the port candidate extraction unit 43d is reserved by another UAV 1 (that is, the reservation status) on the basis of reservation information of each of the ports.

The port determination unit 43f determines, on the basis of the aircraft information received by the information reception unit 43c, a port for the emergency landing of the UAV 1 that asks for the emergency landing. For example, the port determination unit 43f determines, from among the port candidates extracted by the port candidate extraction unit 43d, a port relatively close to the current position of the UAV 1 that asks for the emergency landing (desirably, the nearest port) as a port for the emergency landing of the UAV 1. At this time, the port determination unit 43f determines the port for the emergency landing of the UAV 1 that asks for the emergency landing on the basis of the reservation status determined by the reservation presence/absence determination unit 43e. For example, the port determination unit 43f determines, as the port for the emergency landing of the UAV 1 that asks for the emergency landing, a port candidate determined to have no reservation by another UAV 1 within a predetermined period before and after scheduled arrival time identified by the aircraft information of the UAV 1 that asks for the emergency landing (that is, a port candidate determined to have no reservation date and time within the predetermined period). Incidentally, the scheduled arrival time is calculated from: a distance from the current position of UAV 1 to an installation position of the port; and a flight speed of the UAV 1.

However, it is desirable to also consider the aircraft information of the other UAV 1 because there is an assumed case where arrival is excessively earlier or excessively later than the reservation date and time of the other UAV 1. In other words, in a case where it is determined by the reservation presence/absence determination unit 43e that the port candidate is reserved, the information request transmission unit 43b transmits, to the UTMS 3, the information request for the other UAV 1 together with the aircraft ID of the other UAV 1 that has already reserved the port. The information reception unit 43c receives the aircraft information provided in response to the information request and related to the other UAV 1. Then, the port determination unit 43f determines, on the basis of the aircraft information of the other UAV 1, whether or not the port candidate reserved by the other UAV 1 is available for landing. In a case of determining that the port candidate is available for landing, the port determination unit 43f determines the port candidate as a port for the emergency landing of the UAV 1 that asks for the emergency landing.

Here, it is preferable that whether or not the port candidate is available for landing be determined on the basis of the scheduled arrival time identified by the aircraft information of the other UAV 1. For example, in a case where a time from the current time to the scheduled arrival time of the other UAV 1 is a threshold or more (that is, there is a sufficient time before the arrival of the other UAV 1), the port candidate reserved by the other UAV 1 is determined as the port available for landing. Alternatively, in a case where the scheduled arrival time of the other UAV 1 is not included within the predetermined period before and after the scheduled arrival time of the UAV 1 that asks for the emergency landing, the port candidate reserved by the other UAV 1 may also be determined as the port available for landing. Alternatively, in a case where a flight plan of the other UAV 1 is changed by the UTMS 3 (the traffic processing unit 33c), the port candidate reserved by the other UAV 1 may also be determined as the port available for landing.

The instruction transmission unit 43g transmits, to the UAV 1 that asks for the emergency landing, a landing instruction to land at the port determined by the port determination unit 43f. Incidentally, the landing instruction may also be transmitted from the PMS 4 to the UAV 1 via the UASO 2 (GCS).

The reservation processing unit 43h performs, in response to a port reservation request, processing of reserving the port for landing of the UAV 1 at reservation date and time related to the reservation request. Incidentally, this reservation request is received from, for example, the UASO 2 that manages the UAV 1. Moreover, in a case where the port candidate reserved by the other UAV 1 is determined as the port for the emergency landing of the UAV 1 that asks for the emergency landing, the reservation processing unit 43h performs processing of reserving a new port for landing of the other UAV 1 at the reservation date and time of the other UAV 1.

[2. Operation of Unmanned Aerial Vehicle System S]

Figure 7:
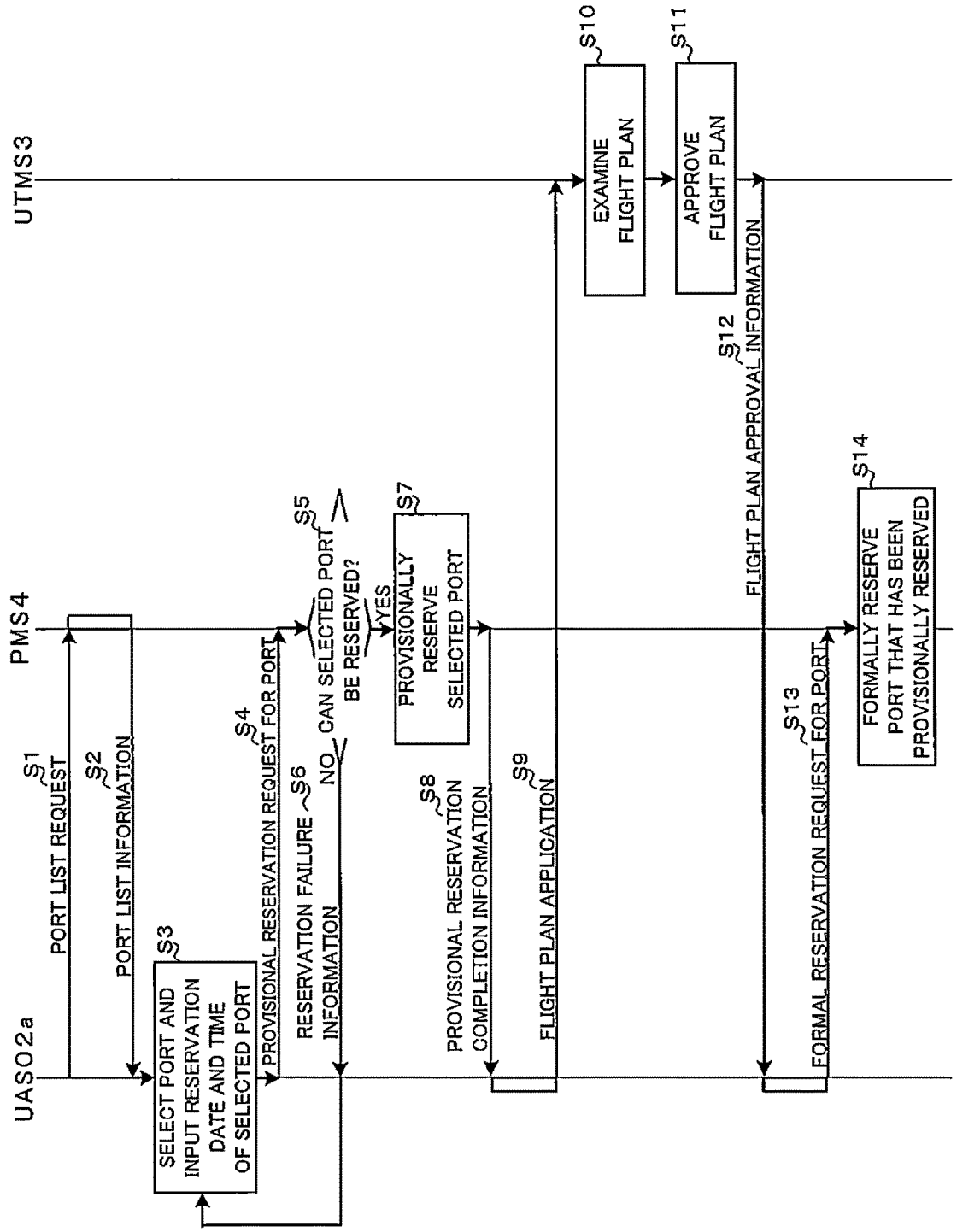
FIG. 7 is a sequence diagram illustrating exemplary operation of the unmanned aerial vehicle system S until a port for landing of an UAV 1a is reserved.

Next, an operation of the unmanned aerial vehicle system S according to the present embodiment will be described. First, the operation of the unmanned aerial vehicle system S until a port for landing of the UAV 1a is reserved will be described with reference to FIG. 7. FIG. 7 is a sequence diagram illustrating exemplary operation of the unmanned aerial vehicle system S until a port for landing of the UAV 1a is reserved.

In FIG. 7, the UASO 2a that manages the UAV 1a transmits a port list request to the PMS 4 (step S1). The port list request is a message indicating a request for port list information. The port list information includes, for example, position information of a plurality of ports managed by the PMS 4. Next, when the port list request is received from the UASO 2a, the PMS 4 transmits the port list information to the UASO 2a (step S2).

Next, when the port list information is received from the PMS 4, the UASO 2a selects a port from the port list information in accordance with, for example, an instruction from a user, and inputs reservation date and time of the selected port (step S3). Next, the UASO 2a transmits a provisional reservation request for the port to the PMS 4 together with the aircraft ID of the UAV 1a, the operator ID of the UASO 2a, the port ID of the selected port, and the input reservation date and time (step S4). The provisional reservation request is a message indicating the provisional reservation request.

Next, when the provisional reservation request is received from the UASO 2a, the PMS 4 determines whether or not the selected port can be reserved (step S5). For example, the PMS 4 refers to reservation information of the selected port, and in a case where the port is not reserved by another UAV 1b and the like at the reservation date and time related to the provisional reservation request, the PMS 4 determines that the selected port can be reserved. In a case where it is determined that the selected port cannot be reserved (step S5: NO), the PMS 4 transmits, to the UASO 2a, reservation failure information indicating that the selected port cannot be reserved (step S6). Next, when the reservation failure information is received from the PMS 4, the UASO 2a selects a different port from the port list information and transmits a provisional reservation request to the PMS 4 in a similar manner described above.

On the other hand, in a case where the PMS 4 determines that the selected port can be reserved (step S5: YES), the PMS 4 performs processing of provisionally reserving the selected port (step S7). In this processing, provisional reservation information including the aircraft ID of the UAV 1a that has made the provisional reservation, the operator ID of the UASO 2a, the reservation date and time, and the like is generated, and the provisional reservation information is stored in the storage unit 42 in a manner correlated to the port ID of the port provisionally reserved.

Next, the PMS 4 transmits, to the UASO 2a, provisional reservation completion information indicating completion of the provisional reservation (step S8). Next, when the provisional reservation completion information is received from the PMS 4, the UASO 2a transmits a flight plan application to the UTMS 3 together with flight plan information of the UAV 1a (step S9). The flight plan application is a message indicating the flight plan application.

Next, when the flight plan application is received from the UASO 2a, the UTMS 3 determines whether or not the flight plan indicated by the flight plan information satisfies the predetermined criteria (flight plan examination) (step S10). Next, In a case where it is determined that the flight plan satisfies the criteria, the UTMS 3 approves the flight plan (flight plan approval) (step S11) and transmits flight plan approval information indicating the flight plan approval to the UASO 2a (step S12). Incidentally, in a case where the flight plan does not satisfy the criteria, the flight plan is not approved.

Next, when the flight plan approval information is received from the UTMS 3, the UASO 2a transmits, to the PMS 4, a formal reservation request together with the aircraft ID of the UAV 1a, the operator ID of the UASO 2a, and the flight plan approval information (step S13). The formal reservation request is a message indicating the formal reservation request.

Next, when the formal reservation request is received from the UASO 2a, the PMS 4 performs processing of formally reserving the port that has been provisionally reserved on the basis of the provisional reservation information generated in step S7 (step S14). In this processing, reservation information including the aircraft ID of the UAV 1a that has formally reserved the port, the operator ID of the UASO 2a, the reservation date and time, and the like is generated, and the reservation information is stored in the storage unit 42 in a manner correlated to the port ID of the port formally reserved.

Figure 8:
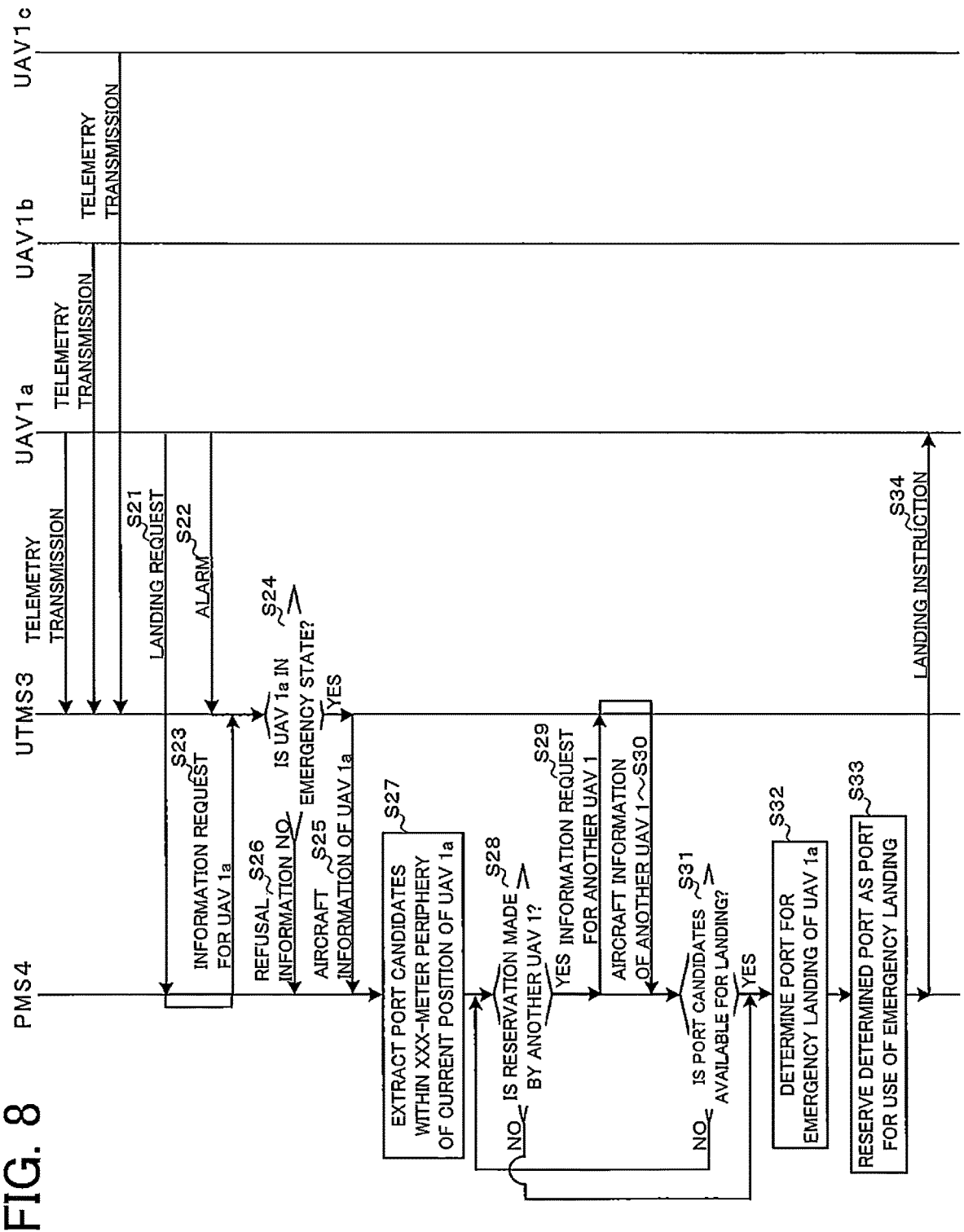
FIG. 8 is a sequence diagram illustrating an exemplary operation of the unmanned aerial vehicle system S until the malfunctioning UAV 1a makes an emergency landing.

Next, an operation of the unmanned aerial vehicle system S until the UAV 1a that has started malfunctioning during flight makes an emergency landing will be described with reference to FIG. 8 and FIG. 9. FIG. 8 is a sequence diagram illustrating an exemplary operation of the unmanned aerial vehicle system S until the malfunctioning UAV 1a makes the emergency landing. FIG. 9 is a conceptual diagram illustrating reservation statuses of respective ports Pa to Pe arranged within an xxx-meter periphery from a current position of the malfunctioning UAV 1a. Incidentally, in the examples of FIGS. 8 and 9, it is assumed that the UAVs 1a, 1b, and 1c respectively fly to ports already reserved.

In FIG. 8, the UAVs 1a, the UAV 1b, and the UAV 1c in flight periodically transmit own aircraft IDs and aircraft information to the UTMS 3, respectively (telemetry transmission). When the UAV 1a detects any malfunction, the UAV 1a transmits, to the PMS 4, a landing request to ask for the emergency landing, together with the aircraft ID of the UAV 1a (step S21). The landing request is a message indicating the landing request.

Next, the UAV 1a transmits an alarm to the UTMS 3 together with the aircraft ID of the UAV 1a (step S22). The alarm is a message indicating the alarm. Incidentally, the UAV 1a may also transmit the alarm to the UTMS 3 before transmitting the landing request to the PMS 4.

Next, when the aircraft ID and the landing request are received from the UAV 1a that asks for the emergency landing, the PMS 4 transmits, to the UTMS 3, information request for the UAV 1a together with the aircraft ID of the UAV 1a (step S23). The information request is a message indicating the information request. Incidentally, the PMS 4 confirms, with the UTMS 3, whether or not the UAV 1a that asks for the emergency landing is in the emergency state, and in a case where it is confirmed that the UAV 1a is in the emergency state, the PMS 4 may transmit, to the UTMS 3, the information request for the UAV 1a that asks for the emergency landing.

Next, when the aircraft ID and the alarm are received from the UAV 1a and also the aircraft ID and the information request for the UAV 1a are received from the PMS 4, the UTMS 3 determines whether or not the UAV 1a is in the emergency state (step S24). For example, in a case where the aircraft ID received together with the alarm coincides with the aircraft ID received together with the information request, the UTMS 3 determines that the UAV 1a that asks for the emergency landing is in the emergency state. According to this configuration, it is possible to ensure reliability in determining that the UAV 1a that asks for the emergency landing is in the emergency state.

Then, in the case of determining that the UAV 1a is in the emergency state (determining presence of emergency) (step S24: YES), the UTMS 3 transmits the aircraft information of the UAV 1a to the PMS 4 (step S25). Incidentally, for example, in a case where a battery of the UAV 1a is malfunctioning, the aircraft information of the UAV 1a may include distance information that indicates, on the basis of a remaining amount in the battery, a distance that can be reached by the UAV 1a. On the other hand, in the case of determining that the UAV 1a is not in the emergency state (step S24: NO), the UTMS 3 transmits, to the PMS 4, refusal information indicating refusal of providing the information of the UAV 1a (step S26). When the refusal information is received from the UTMS 3, the PMS 4 may also transmit, to the UAV 1a, refusal information indicating refusal of the emergency landing.

Incidentally, in step S24, the UTMS 3 may determine that the UAV 1a that asks for the emergency landing is in the emergency state in a case where the aircraft ID received together with the information request is stored in the storage unit 32 in a manner correlated to the flight plan information. In other words, in a case where the aircraft ID received together with the information request is the aircraft ID of UAV 1a having the flight plan approved, it is determined that the UAV 1a is in the emergency state. In this case, the UAV 1a may not necessarily transmit, to the UTMS 3, the alarm together with the aircraft ID of the UAV 1a in step S22.

Next, when the aircraft information of the UAV 1a is received from the UTMS 3, the PMS 4 extracts, from among a plurality of ports, ports located within the xxx-meter periphery of a current position of the UAV 1a as port candidates for the emergency landing of the UAV 1a (step S27). By this configuration, a port for the emergency landing of the UAV 1a can be determined from among the port candidates located closer in the view from the current position of the UAV 1a that asks for the emergency landing. For example, the ports Pa to Pe illustrated in FIG. 9 are extracted as the port candidates for the emergency landing of the UAV 1a. Incidentally, in a case where distance information indicating a distance that can be reached by the UAV 1a is included in the aircraft information of the UAV 1a, the PMS 4 may extract, from among the plurality of ports, ports located within the distance indicated by the distance information from the current position of the UAV 1a as the port candidates for the emergency landing of the UAV 1a.

Next, the PMS 4 determines, on the basis of reservation information of each of the port candidates, whether or not each of the port candidates extracted in step S27 is reserved by another UAV 1 (step S28). This determination is performed in the order from ports located closer to the current position of the UAV 1a, for example. Then, in a case where the PMS 4 determines that any of the port candidates is not reserved by the other UAV 1 (step S28: NO), the PMS 4 proceeds to step S32. On the other hand, in a case where the PMS 4 determines that any of the port candidates is reserved by the other UAV 1 (step S28: YES), the PMS 4 proceeds to step S29.

Here, in the example of FIG. 9, the port Pa is located closest to the current position of the UAV 1a but is reserved by the UAV 1d and currently in use (the UAV 1d is landing). Moreover, the port Pb is located second closest to the current position of the UAV 1a, but is reserved by the UAV 1b and there is not a sufficient time before arrival of the UAV 1b (promptly before arrival). Moreover, the port Pc is located third closest to the current position of the UAV 1a and is reserved by the UAV 1c, but there is a sufficient time before arrival of the UAV 1c. Incidentally, the ports Pd and Pe located fourth and fifth closest to the current position of the UAV 1a have no reservation.

In step S29, the PMS 4 transmits, to the UTMS 3, an information request for the other UAV 1 together with the aircraft ID of the other UAV 1 that has already reserved the above-described port candidate. Next, when the aircraft ID and the information request for the other UAV 1 are received from the PMS 4, the UTMS 3 transmits aircraft information of the other UAV 1 to the PMS 4 (step S30).

Next, when the aircraft information of the other UAV 1 is received from the UTMS 3, the PMS 4 determines, on the basis of scheduled arrival time identified by the aircraft information of the other UAV 1, whether or not the port candidate reserved by the other UAV 1 is available for landing (step S31). According to this configuration, even the port reserved by the other UAV 1 can be determined as a port for the emergency landing of the UAV 1a that asks for the emergency landing.

Then, in a case of determining that the port candidate reserved by the other UAV 1 is not available for landing (step S31: NO), the PMS 4 returns to step S28 and performs the processing from step S28 for another port candidate out of the port candidates extracted in step S27. On the other hand, in a case of determining that the port candidate reserved by the other UAV 1 is available for landing (step S31: YES), the PMS 4 proceeds to step S32.

In step S32, the PMS 4 determines, as the port for the emergency landing of the UAV 1a that asks for the emergency landing, the port candidate determined as the port having no reservation in step S28 or the port candidate determined as the port available for landing in step S31. Then, the PMS 4 performs processing of reserving the port determined in step S32 as the port for the emergency landing of the UAV 1a at the scheduled arrival time of the UAV 1a (step S33). That is, the determined port is reserved for use of the emergency landing. In this processing, reservation information including the aircraft ID of the UAV 1a that makes the emergency landing at the port determined in step S32, the operator ID of the UASO 2a, the scheduled arrival date and time, and the like is generated, and the reservation information is stored in the storage unit 42 in a manner correlated to the port ID of the determined port. Incidentally, after step S33, the PMS 4 cancels (invalidates) the reservation (reservation before the malfunction) of the port originally made by the UAV 1a that asks for the emergency landing. With this procedure, the port reservation information for the UAV 1a is deleted.

In the example of FIG. 9, the port Pc in which there is a sufficient time before the arrival of the other UAV is is determined as the port for the emergency landing of the UAV 1a. Thus, in a case where the port reserved by the other UAV 1c is determined as the port for the emergency landing of the UAV 1a, there is an assumed case where reservation date and time of the other UAV 1c are included within the predetermined period before and after the scheduled arrival time of the UAV 1a. In this case, the PMS 4 performs processing of reserving a new port for landing of the other UAV 1c at the reservation date and time of the other UAV 1c that has reserved the port Pc where the UAV 1a is to make the emergency landing. In this processing, for example, the port Pd located closest to the port Pc and having no reservation out of the plurality of ports managed by the PMS 4 in FIG. 9 is reserved as the new port for landing of the other UAV 1c instead of the port Pc reserved by the other UAV 1c. According to this configuration, the new port can be automatically reserved without making a UASO 2 of the other UAV 1 reserve a new port.

Next, the PMS 4 transmits, to the UAV 1a that asks for the emergency landing, a landing instruction to land at the port determined in step S32 (step S34). The landing instruction is a message indicating the landing instruction. The landing instruction includes position information of the port determined in step S32. With this landing instruction, the UAV 1a flies to the port where the UAV 1a is instructed to land and makes the emergency landing at the port. Incidentally, in a case where the UAV 1a that asks for the emergency landing cannot make the emergency landing at the port due to forced landing or the like, the PMS 4 may cancel the reservation made in step S33 (that is, delete the reservation information). Information indicating the failure of the emergency landing may be transmitted from the UAV 1a or the UASO 2a to the PMS 4 or may be transmitted from the UTMS 3 to the PMS 4.

Next, a specific example of the processing of the PMS 4 in FIG. 8 will be described with reference to FIG. 10. FIG. 10 is a flowchart illustrating the specific example of the processing of the PMS 4 in FIG. 8. The processing illustrated in FIG. 10 is started in a case where the aircraft ID and the landing request are received from the UAV 1a that asks for the emergency landing.

When the processing illustrated in FIG. 10 is started, the PMS 4 confirms, with the UTMS 3, presence/absence of emergency of the UAV 1a that asks for the emergency landing (step S101). For example, the PMS 4 transmits a request for confirming the presence/absence of emergency to the UTMS 3 together with the aircraft ID of the UAV 1a, and receives a response indicating the presence/absence of emergency from the UTMS 3. Thus, since the PMS 4 confirms the emergency of the UAV 1a prior to the information request, when the information request for the UAV 1a is made afterward, the PMS 4 can promptly obtain the aircraft information of the UAV 1a.

Then, in a case where the PMS 4 determines that the UAV 1a is not in emergency as a result of the confirmation (step S102: NO), the PMS 4 transmits refusal information indicating refusal of the emergency landing to the UAV 1a (error response) (step S103). On the other hand, in a case where the PMS 4 determines that the UAV 1a is in emergency (that is, the UAV 1a is in the emergency state) as a result of the confirmation (step S102: YES), the PMS 4 proceeds to step S104.

In step S104, the PMS 4 transmits the information request for the UAV 1a to the UTMS 3 together with the aircraft ID of the UAV 1a and thereby acquires the aircraft information of the UAV 1a from the UTMS 3. Next, the PMS 4 refers to position information stored in the storage unit 42 for each of a plurality of ports and extracts ports located within the xxx-meter periphery of a current position of the UAV 1a as port candidates for the emergency landing of the UAV 1a (step S105).

Next, the PMS 4 determines whether there is any port candidate for the emergency landing of the UAV 1a (step S106). Then, in a case of determining that there is no port candidate for the emergency landing of the UAV 1a (step S106: NO), the PMS 4 transmits, to the UAV 1a, refusal information indicating refusal of the emergency landing (error response) (step S107). On the other hand, in a case of determining that there is a port candidate for the emergency landing of the UAV 1a (step S106: YES), the PMS 4 proceeds to step S108.

In step S108, the PMS 4 selects a port located closest to the current position of the UAV 1a from among the port candidates determined to exist in step S106. For example, the PMS 4 calculates a distance from the current position of the UAV 1a to an installation position of each of the ports, and selects a port having the shortest calculated distance.

Next, the PMS 4 checks an airspace status above the port selected in step S108 (step S109). Next, the PMS 4 determines whether or not the airspace above the port checked in step S109 is vacant (step S110). Then, in a case where there is an obstacle such as a bird in the airspace above the port candidate, the PMS 4 determines that the airspace above the port is not vacant (step S110: NO) and proceeds to step S111. On the other hand, in a case where there is no obstacle such as a bird in the airspace above the port, the PMS 4 determines that the airspace above the port is vacant (step S110: YES) and proceeds to step S112.

In step S111, the PMS 4 excludes, from the port candidates determined to exist in step S106, a port determined to have no vacant airspace in step S110, and returns to step S106. With this procedure, the processing from step S106 is performed for ports other than the excluded port.

In step S112, the PMS 4 checks a ground status of the port determined to have the vacant airspace in step S110. Next, the PMS 4 determines whether or not the ground of the port checked in step S112 is vacant (step S113). Then, in a case where there is an obstacle such as luggage or a small animal on the ground of the port, the PMS 4 determines that the ground of the port is not vacant (step S113: NO) and excludes, from the port candidates determined to exist in step S106 (step S111), the port determined to have no vacant ground, and then returns to step S106. On the other hand, in a case where there is no obstacle such as a small animal on the ground of the port, the PMS 4 determines that the ground of the port is vacant (step S113: YES) and proceeds to step S114.

In step S114, the PMS 4 checks a reservation status of the port determined to have the vacant ground in step S113. Next, the PMS 4 determines, on the basis of reservation information of the port, whether or not the port determined to have the vacant ground in step S113 is reserved by another UAV 1 (step S115). Then, in a case of determining that the port is not reserved by the other UAV 1 (step S115: NO), the PMS 4 proceeds to step S119. On the other hand, in a case of determining that the port is reserved by the other UAV 1 (step S115: YES), the PMS 4 proceeds to step S116.

In step S116, the PMS 4 transmits, to the UTMS 3, an information request for the other UAV 1 together with the aircraft ID of the other UAV 1 that has reserved the port determined in step S115, and thereby acquires aircraft information of the other UAV 1 from the UTMS 3. Next, the PMS 4 calculates scheduled arrival time of the other UAV 1 on the basis of the aircraft information acquired in step S116 (step S117). Incidentally, the scheduled arrival time is calculated from: a distance from a current position of the other UAV 1 to an installation position of the port reserved by the other UAV 1; and a flight speed of the other UAV 1.

Next, the PMS 4 determines, on the basis of the scheduled arrival time calculated in step S117, whether or not the port reserved by the other UAV 1 is available for landing (step S118). For example, in a case where a time from the current time to the scheduled arrival time of the other UAV 1 is a threshold or more, it is determined that the port reserved by the other UAV 1 is available for landing. According to this configuration, even the port reserved by the other UAV 1 can be determined as a port for the emergency landing of the UAV 1a that asks for the emergency landing as far as there is a sufficient time before arrival of the other UAV 1. In a case of determining that the port reserved by the other UAV 1 is not available for landing (step S118: NO), the PMS 4 excludes, from the port candidates determined to exist in step S106, a port determined as the port not available for landing (step S111) and returns to step S106. On the other hand, in a case of determining that the port reserved by the other UAV 1 is available for landing (that is, a port available for landing is found) (step S118: YES), the PMS 4 proceeds to step S119.

In step S119, the PMS 4 determines, as the port for the emergency landing of the UAV 1a that asks for the emergency landing, the port determined to have no reservation in step S115 or the port determined as the port available for landing in step S118. Next, the PMS 4 performs processing of reserving the port determined in step S119 as the port for the emergency landing of the UAV 1a at the scheduled arrival time of the UAV 1a (step S120). Next, the PMS 4 transmits, to the UAV 1a that asks for the emergency landing, a landing instruction to land at the port determined in step S119 (step S121) and ends the processing illustrated in FIG. 10.

Incidentally, in a case where the port available for landing cannot be finally found in loop processing of steps S106 to S118, the PMS 4 may transmit, to the UTMS 3, a change request for a flight plan of the other UAV 1 together with the aircraft ID/IDs of one or the plurality of different UAVs 1 that has reserved the port candidates determined to exist in step S106, without performing the processing in step S107. In this case, when the change request for the flight plan is received from the PMS 4, the UTMS 3 changes the flight plan of the other UAV 1 that has reserved a port (for example, a port located closest to the current position of the UAV 1a) that becomes a candidate for the emergency landing of the UAV 1a. For example, the UTMS 3 changes a destination area (destination) on a scheduled route of the other UAV 1. Next, the UTMS 3 transmits, to the PMS 4, a change instruction to change the port reserved by the other UAV 1, together with the aircraft ID and the changed destination area of the other UAV 1. Next, when the change instruction is received from the UTMS 3, the PMS 4 changes the port reserved by the other UAV 1 to any one of ports located within the changed destination area, and transmits position information of the changed port to the other UAV 1 or to a UASO 2 that manages the same. With this configuration, the other UAV 1 is to fly to the changed port. Then, the PMS 4 proceeds to step S119 (or proceeds to step S119 after it is determined in step S118 that the port reserved by the other UAV 1 is available for landing) and determines the port reserved by the other UAV 1 as the port for the emergency landing of the UAV 1a. According to this con-figuration, the UAV 1a can be provided with the port available for landing of the UAV 1a that asks for the emergency landing.

As a different example of changing a flight plan, the UTMS 3 may make a change to delay scheduled landing time of the other UAV 1. In this case, the UTMS 3 transmits, to the PMS 4, a waiting instruction to make the other UAV 1 wait for landing, together with the aircraft ID and the scheduled landing time of the other UAV 1. Next, when the waiting instruction is received from the UTMS 3, the PMS 4 sets a waiting time during which the other UAV 1 is made to wait for the landing on the basis of the scheduled landing time of the other UAV 1 and the scheduled arrival time of the UAV 1a that asks for the emergency landing. This waiting time is set such that the other UAV 1 can land at a port after the UAV 1a that asks for the emergency landing lands at the port and is evacuated from the port. Next, the PMS 4 transmits, to the other UAV 1 or the UASO 2 that manages the same, the waiting instruction to make the other UAV 1 wait for the landing together with the set waiting time. With this configuration, the other UAV 1 waits (for example, waits while hovering) during the waiting time in the vicinity of the port reserved. Then, the PMS 4 proceeds to step S119 (or proceeds to step S119 after it is determined in step S118 that the port reserved by the other UAV 1 is available for landing) and determines the port reserved by the other UAV 1 as the port for the emergency landing of the UAV 1a. According to this configuration, the UAV 1a can be provided with the port available for landing of the UAV 1a that asks for the emergency landing.

As described above, according to the above-described embodiment, in the case of receiving the landing request from the UAV 1 that asks for the emergency landing, the PMS 4 transmits the information request for the UAV 1 to the UTMS 3, and the UTMS 3 transmits at least position information of the UAV 1 to the PMS 4 in response to the information request only in a case where the UAV 1 that asks for the emergency landing is in the emergency state, and therefore, it is possible to have the malfunctioning UAV 1 promptly make the emergency landing at the port managed by the PMS 4 while limiting disclosure of at least the position information of the UAV 1. In other words, according to the above-described embodiment, it is possible to ensure information security because important information (for example, information corresponding to a trade secret and the like) from which the flight route of the UAV 1 can be easily identified can be prevented from being provided to the outside, and furthermore, the UAV 1 that has fallen in the emergency state can be preferentially guided to a port where the UAV 1 is made to make the emergency landing.

Incidentally, it is assumed that the port for the emergency landing of the malfunctioning UAV 1a is different from the port reserved by the UAV 1a at the normal time. Additionally, in a case that the UAV 1a lands at the port reserved at the normal time, there is an assumed case where the UAV 1a receives a radio signal (e.g., a beacon) sent from the port, collates the port ID included in the received radio signal with the port ID preliminarily stored in the UAV 1a, and lands at the port after collating. In this case, it is preferable to provide, to the UAV 1a from the PMS 4, the port ID of the port for the emergency landing of the UAV 1a, together with the landing instruction. According to this configuration, the UAV 1a can store the port ID provided together with the landing instruction, in place of the preliminarily-stored port ID. Then, the UAV 1a can make the emergency landing at the port after collating, with the port ID provided together with the landing instruction, the port ID included in the radio signal sent from the port for the emergency landing. Alternatively, the port ID of the port included in the radio signal sent from the port for the emergency landing of the UAV 1a may be changed to the port ID reserved by the UAV 1a at the normal time, instead of providing the port ID of the port for the emergency landing of the UAV 1a from the PMS 4 to the UAV 1a together with the landing instruction (that is, while keeping the preliminarily-stored port ID as it is). In this case, the UAV 1a can make the emergency landing at the port after collating, with the preliminarily-stored port ID, the port ID included in the radio signal sent from the port for the emergency landing.

As another example, in a case that the UAV 1a lands at the port reserved at the normal time, there is an assumed case where the UAV 1a captures an image of a mark displayed on the port (for example, a symbol or a pattern unique to the port), recognizes the image of the mark by image analysis, collates the recognized image of the mark with an image of a mark preliminarily stored in the UAV 1a, and the UAV 1a lands at the port after collating. In this case, it is preferable that the image of the mark displayed on the port for the emergency landing of the UAV 1a be provided from the PMS 4 to the UAV 1a together with the landing instruction. According to this configuration, the UAV 1a can store the image of the mark provided together with the landing instruction, in place of the preliminarily-stored image of the mark. Then, the UAV 1a can make the emergency landing at the port after collating, with the image of the mark provided together with the landing instruction and then stored, the image of the mark recognized by capturing the image of the mark displayed on the port for the emergency landing. Alternatively, the image of the mark displayed on the port for the emergency landing of the UAV 1a may be changed to a mark displayed on the port reserved by the UAV 1a at the normal time, without providing the image of the mark of the port for the emergency landing of the UAV 1a from the PMS 4 to the UAV 1a together with the landing instruction (that is, while keeping the image of the preliminarily-stored mark as it is). In this case, the UAV 1a can make the emergency landing at the port after collating, with the preliminarily-stored image of the mark, the image of the mark recognized by capturing the image of the mark changed on the port for the emergency landing.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention.

REFERENCE SIGNS LIST

1 UAV
2 UASO
3 UTMS
4 PMS
11 Drive unit
12 Positioning unit
13 Radio communication unit
14 Imaging unit
15 Control unit
31 Communication unit
32 Storage unit
33 Information processing unit
33a Information acquisition unit
33b Information management unit
33c Traffic processing unit
33d Information request reception unit
33e Alarm reception unit
33f Emergency determination unit
33g Transmission control unit
41 Communication unit
42 Storage unit
43 Information processing unit
43a Landing request reception unit
43b Information request transmission unit
43c Information reception unit
43d Port candidate extraction unit
43e Reservation presence/absence determination unit
43f Port determination unit
43g Instruction transmission unit
43h Reservation processing unit
S Unmanned aerial vehicle system

The invention claimed is:

1. An unmanned aerial vehicle traffic management apparatus, comprising:
at least one memory configured to store program code; and
at least one processor configured to access the program code and operate as instructed by the program code, the program code including:
information acquisition code configured to cause at least one of the at least one processor to acquire position information indicating a flight position of an unmanned aerial vehicle;
information management code configured to cause at least one of the at least one processor to manage at least the position information indicating the flight position of the unmanned aerial vehicle as information confidential to an outside agent to the unmanned aerial vehicle traffic management apparatus except for a time of emergency;
traffic processing code configured to cause at least one of the at least one processor to perform processing related to traffic management of the unmanned aerial vehicle;
request reception code configured to cause at least one of the at least one processor to receive, from a takeoff and landing facility management apparatus, a first request for information of the unmanned aerial vehicle that asks for an emergency landing at a takeoff and landing facility; and
transmission control code configured to cause at least one of the at least one processor to perform transmission control of aircraft information such that the aircraft information including the position information indicating the flight position of the unmanned aerial vehicle that asks for the emergency landing is provided to the takeoff and landing facility management apparatus in response to the first request from the takeoff and landing facility management apparatus in a case where the unmanned aerial vehicle that asks for the emergency landing is in an emergency state wherein the emergency state is defined as a state of malfunction of a drive system or a power supply system in the unmanned aerial vehicle,
wherein the emergency state is self-diagnosed using input from at least one sensor in the unmanned aerial vehicle, and
wherein in a case where the unmanned aerial vehicle that asks for the emergency landing is in the emergency state, the traffic processing code causes at least one of the at least one processor to change a flight plan of a second unmanned aerial vehicle that has reserved the takeoff and landing facility based on the second unmanned aerial vehicle being within a predetermined distance from the takeoff and landing facility when the unmanned aerial vehicle asks for the emergency landing.

2. The unmanned aerial vehicle traffic management apparatus of claim 1, wherein
the request reception code causes at least one of the at least one processor to receive, together with the first request, identification information of the unmanned aerial vehicle that asks for the emergency landing, and
the program code further includes:
alarm reception code configured to cause at least one of the at least one processor to receive the identification information of the unmanned aerial vehicle together with an alarm from the unmanned aerial vehicle that asks for the emergency landing; and
determination code configured to cause at least one of the at least one processor to determine that the unmanned aerial vehicle that asks for the emergency landing is in the emergency state in a case where the identification information received by the request reception code coincides with the identification information received by the alarm reception code.

3. The unmanned aerial vehicle traffic management apparatus of claim 1, wherein the traffic processing code causes at least one of the at least one processor to manage a flight status of the unmanned aerial vehicle in accordance with the aircraft information of the unmanned aerial vehicle.

4. The unmanned aerial vehicle traffic management apparatus of claim 1, wherein
the request reception code causes at least one of the at least one processor to receive a second request for information of the second unmanned aerial vehicle that has reserved the takeoff and landing facility when the takeoff and landing facility is within a predetermined periphery of the unmanned aerial vehicle that asks for the emergency landing, and
based on the unmanned aerial vehicle that asks for the emergency landing being in the emergency state and on receiving the second request for information of the second unmanned aerial vehicle, the transmission control code causes at least one of the at least one processor to perform the transmission control for second aircraft information such that the second aircraft information including second position information indicating a flight position of the second unmanned aerial vehicle is provided to the takeoff and landing facility management apparatus in response to the second request from the takeoff and landing facility management apparatus.

5. A takeoff and landing facility management apparatus, comprising:
at least one memory configured to store program code; and
at least one processor configured to access the program code and operate as instructed by the program code, the program code including:
request transmission code configured to cause at least one of the at least one processor to transmit, to an unmanned aerial vehicle traffic management apparatus, a first request for information of an unmanned aerial vehicle that asks for an emergency landing;
information reception code configured to cause at least one of the at least one processor to receive aircraft information provided in response to the first request and including position information indicating a flight position of the unmanned aerial vehicle that asks for the emergency landing; and
facility determination code configured to cause at least one of the at least one processor to determine, on the basis of the aircraft information of the unmanned aerial vehicle that asks for the emergency landing, a takeoff and landing facility for the emergency landing of the unmanned aerial vehicle that asks for the emergency landing and the program code further including state confirmation code configured to cause at least one of the at least one processor to confirm, with the unmanned aerial vehicle traffic management apparatus, whether or not the unmanned aerial vehicle that asks for the emergency landing is in an emergency state, wherein the emergency state is defined as a state of malfunction of a drive system or a power supply system in the unmanned aerial vehicle;
wherein in a case where it is confirmed by the state confirmation code that the unmanned aerial vehicle that asks for the emergency landing is in the emergency state, the request transmission code causes at least one of the at least one processor to transmit, to the unmanned aerial vehicle traffic management apparatus, the first request for information of the unmanned aerial vehicle that asks for the emergency landing;
wherein the emergency state is self-diagnosed using input from at least one sensor in the unmanned aerial vehicle; and
wherein the program code further includes facility candidate extraction code configured to cause at least one of the at least one processor to extract, from among a plurality of the takeoff and landing facilities, the takeoff and landing facility located within a predetermined range from the flight position of the unmanned aerial vehicle that asks for the emergency landing as a candidate of the takeoff and landing facility for the emergency landing of the unmanned aerial vehicle that asks for the emergency landing.

6. The takeoff and landing facility management apparatus of claim 5, the program code further including instruction transmission code configured to cause at least one of the at least one processor to transmit, to the unmanned aerial vehicle that asks for the emergency landing, a landing instruction to land at the takeoff and landing facility determined by the facility determination code.

7. The takeoff and landing facility management apparatus of claim 5, the program code further including reservation presence/absence determination code configured to cause at least one of the at least one processor to determine whether or not the candidate of the takeoff and landing facility extracted by the facility candidate extraction code is reserved by another unmanned aerial vehicle,
wherein_in a case where the reservation presence/absence determination code causes at least one of the at least one processor to determine that no reservation is made, the facility determination code causes at least one of the at least one processor to determine the candidate of the takeoff and landing facility as the takeoff and landing facility for the emergency landing of the unmanned aerial vehicle that asks for the emergency landing.

8. The takeoff and landing facility management apparatus of claim 5, the program code further including reservation presence/absence determination code configured to cause at least one of the at least one processor to determine whether or not the candidate of the takeoff and landing facility extracted by the facility candidate extraction code is reserved by another unmanned aerial vehicle,
- wherein_in a case where the reservation presence/absence determination code causes at least one of the at least one processor to determine that a reservation is made, the request transmission code causes at least one of the at least one processor to transmit a second request for information of the other unmanned aerial vehicle to the unmanned aerial vehicle traffic management apparatus,
- the information reception code causes at least one of the at least one processor to receive aircraft information provided in response to the second request and including position information indicating a flight position of the other unmanned aerial vehicle, and
- the facility determination code causes at least one of the at least one processor to determine, on the basis of the aircraft information of the other unmanned aerial vehicle, whether or not the candidate of the takeoff and landing facility reserved by the other unmanned aerial vehicle is available for landing, and in a case of determining that the candidate of the takeoff and landing facility is available for landing, the facility determination code causes at least one of the at least one processor to determine the candidate of the takeoff and landing facility as the takeoff and landing facility for the emergency landing of the unmanned aerial vehicle that asks for the emergency landing.

9. The takeoff and landing facility management apparatus of claim 8, wherein the facility determination code causes at least one of the at least one processor to determine, on the basis of scheduled arrival time identified by the aircraft information of the other unmanned aerial vehicle, whether or not the candidate of the takeoff and landing facility is available for landing.

10. The takeoff and landing facility management apparatus of claim 8, the program code further including reservation processing code configured to cause at least one of the at least one processor to perform processing of reserving a new second takeoff and landing facility for landing of the other unmanned aerial vehicle in a case where the takeoff and landing facility reserved by the other unmanned aerial vehicle is determined as a new takeoff and landing facility for the emergency landing of the unmanned aerial vehicle that asks for the emergency landing.

11. An unmanned aerial vehicle system comprising:
- an unmanned aerial vehicle traffic management apparatus; and a takeoff and landing facility management apparatus,
- wherein_the unmanned aerial vehicle traffic management apparatus includes:
  - an information acquisition module configured to acquire position information indicating a flight position of an unmanned aerial vehicle; and
  - an information management module configured to manage at least the position information indicating the flight position of the unmanned aerial vehicle as information confidential to an outside agent to the unmanned aerial vehicle traffic management apparatus except for a time of emergency,
- wherein the unmanned aerial vehicle includes a landing request module configured to request the takeoff and landing facility management apparatus to allow an emergency landing in a case of detecting malfunction,
- wherein the takeoff and landing facility management apparatus includes a request transmission module configured to transmit, to the unmanned aerial vehicle traffic management apparatus, a request for information of the unmanned aerial vehicle that asks for the emergency landing,
- wherein the unmanned aerial vehicle traffic management apparatus further includes:
  - a request reception module configured to receive, from the takeoff and landing facility management apparatus, the request for the information of the unmanned aerial vehicle that asks for the emergency landing; and
  - a transmission control module configured to perform transmission control for aircraft information such that the aircraft information including the position information indicating the flight position of the unmanned aerial vehicle that asks for the emergency landing is provided to the takeoff and landing facility management apparatus in response to the request from the takeoff and landing facility management apparatus in a case where the unmanned aerial vehicle that asks for the emergency landing is in an emergency state, wherein the emergency state is defined as a state of malfunction of a drive system in the unmanned aerial vehicle,
- wherein the emergency state is self-diagnosed using input from at least one sensor in the unmanned aerial vehicle, and
- wherein the takeoff and landing facility management apparatus further includes:
  - an information reception module configured to receive the aircraft information provided in response to the request and related to the unmanned aerial vehicle that asks for the emergency landing;
  - a facility determination module configured to determine, on the basis of the aircraft information of the unmanned aerial vehicle that asks for the emergency landing, a takeoff and landing facility for the emergency landing of the unmanned aerial vehicle that asks for the emergency landing; and
  - an instruction transmission module configured to transmit, to the unmanned aerial vehicle that asks for the emergency landing, a landing instruction to land at the takeoff and landing facility determined by the facility determination module, and
- wherein the program code further includes facility candidate extraction code configured to cause at least one of the at least one processor to extract, from among a plurality of the takeoff and landing facilities, the takeoff and landing facility located within a predetermined range from the flight position of the unmanned aerial vehicle that asks for the emergency landing as a candidate of the takeoff and landing facility for the emergency landing of the unmanned aerial vehicle that asks for the emergency landing.

* * * * *